United States Patent
Ichikawa et al.

(10) Patent No.: US 10,425,909 B2
(45) Date of Patent: Sep. 24, 2019

(54) DETERMINING A COMPUTER BEING OUT OF AN AREA OF BEACON TRANSMISSION

(71) Applicant: FUJITSU LIMITED, Kawasaki-shi, Kanagawa (JP)

(72) Inventors: Shizuko Ichikawa, Atsugi (JP); Hisatoshi Yamaoka, Kawasaki (JP); Miwa Okabayashi, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/629,371

(22) Filed: Jun. 21, 2017

(65) Prior Publication Data
US 2018/0020422 A1 Jan. 18, 2018

(30) Foreign Application Priority Data
Jul. 14, 2016 (JP) ................................. 2016-139091

(51) Int. Cl.
| | |
|---|---|
| *H04W 64/00* | (2009.01) |
| *H04W 48/08* | (2009.01) |
| *H04W 74/08* | (2009.01) |
| *H04W 40/24* | (2009.01) |
| *G01S 1/00* | (2006.01) |
| *H04W 4/02* | (2018.01) |

(52) U.S. Cl.
CPC ............ *H04W 64/00* (2013.01); *G01S 1/00* (2013.01); *H04W 4/02* (2013.01); *H04W 40/244* (2013.01)

(58) Field of Classification Search
CPC . H04W 76/048; H04W 48/08; H04W 40/244; H04W 64/00; H04W 74/08; G01C 22/02; G01S 3/22

USPC ............ 455/456.1, 456.4, 456.2; 340/10.41; 342/155
See application file for complete search history.

(56) References Cited

U.S. PATENT DOCUMENTS

| | | | | |
|---|---|---|---|---|
| 4,963,890 | A | * | 10/1990 | Perrotta .................... G01S 3/22 342/155 |
| 5,524,034 | A | * | 6/1996 | Srygley .................. G01C 22/02 340/10.41 |
| 2004/0066271 | A1 | * | 4/2004 | Leck ....................... G08C 17/02 340/3.1 |
| 2010/0185575 | A1 | | 7/2010 | Lopez et al. |
| 2010/0195595 | A1 | | 8/2010 | Iwata |
| 2012/0114082 | A1 | | 5/2012 | Hayashi et al. |
| 2012/0258730 | A1 | * | 10/2012 | Tinnakornsrisuphap .................... G01S 5/0215 455/456.1 |

(Continued)

FOREIGN PATENT DOCUMENTS

| | | |
|---|---|---|
| JP | 2010-531078 | 9/2010 |
| JP | 2012-104892 | 5/2012 |

(Continued)

*Primary Examiner* — William D Cumming
(74) *Attorney, Agent, or Firm* — Staas & Halsey LLP

(57) ABSTRACT

An information processing method, performed by a computer, includes: acquiring a beacon signal from a radio circuit coupled to a processor of the computer and configured to receive the beacon signal from a transmission source; calculating a length of a monitoring period, based on time intervals at which the beacon signal is received in a period of duration of a stationary state of the computer; and determining as being out of an area in proximity to the transmission source of the beacon signal in a case where the beacon signal is not received during the monitoring period having the length.

19 Claims, 37 Drawing Sheets

(56) References Cited

U.S. PATENT DOCUMENTS

| | | | |
|---|---|---|---|
| 2012/0302261 A1* | 11/2012 | Tinnakornsrisuphap | .................... G01S 5/0226 455/456.4 |
| 2016/0286603 A1* | 9/2016 | Vajapeyam | .......... H04W 76/048 |
| 2017/0142740 A1* | 5/2017 | Gou | ....................... H04W 74/08 |
| 2017/0257817 A1* | 9/2017 | Itagaki | .................. H04W 48/08 |
| 2018/0020422 A1* | 1/2018 | Ichikawa | ............ H04W 40/244 |

FOREIGN PATENT DOCUMENTS

| | | |
|---|---|---|
| JP | 2014-135746 | 7/2014 |
| WO | 2009/016800 | 2/2009 |

* cited by examiner

FIG. 10

| BEACON ID | SERVICE NAME | GEOGRAPHICAL LOCATION | FACILITY TYPE |
|---|---|---|---|
| B1 | S1 | L1 | STATION |
| B2 | S2 | L2 | STADIUM |
| B3 | S3 | L3 | COMMERCIAL FACILITY |
| ⋮ | ⋮ | ⋮ | ⋮ |

FIG. 11

| SERVICE NAME | RESPONSE COEFFICIENT |
|---|---|
| S1 | R1 |
| S2 | R2 |
| S3 | R3 |
| ⋮ | ⋮ |

FIG. 14

| RECEPTION DATE AND TIME | BEACON ID | RADIO WAVE STRENGTH | RECEPTION INTERVAL |
|---|---|---|---|
| $t_1$ | B1 | $r_1$ | $i_1$ |
| $t_2$ | B1 | $r_2$ | $i_2$ |
| $t_3$ | B1 | $r_3$ | $i_3$ |

FIG. 15

| DETERMINATION DATE AND TIME | STATUS | BEACON ID |
|---|---|---|
| $t_{10000}$ | WITHIN AREA | B1 |
| $t_{20000}$ | OUT OF AREA | B1 |
| $t_{30000}$ | WITHIN AREA | B3 |
| ⋮ | ⋮ | ⋮ |

FIG. 19

| UPDATE DATE AND TIME | BEACON ID | MONITORING TIME PERIOD |
|---|---|---|
| $t_{1000}$ | B1 | M1 |
| $t_{6000}$ | B1 | M2 |
| $t_{31000}$ | B3 | M3 |
| ⋮ | ⋮ | ⋮ |

FIG. 33

| UPDATE DATE AND TIME | BEACON ID | MONITORING TIME PERIOD | TERMINAL ID |
|---|---|---|---|
| $t_{1000}$ | B1 | M1 | U1 |
| $t_{6000}$ | B1 | M2 | U1 |
| $t_{15000}$ | B3 | M4 | U2 |
| ⋮ | ⋮ | ⋮ | ⋮ |

DETERMINING A COMPUTER BEING OUT OF AN AREA OF BEACON TRANSMISSION

CROSS-REFERENCE TO RELATED APPLICATION

This application is based upon and claims the benefit of priority of the prior Japanese Patent Application No. 2016-139091, filed on 14 Jul. 2016, the entire contents of which are incorporated herein by reference.

FIELD

The embodiments discussed herein are related to a technology for sensing a state of being in proximity to a transmission source of a wireless signal.

BACKGROUND

There is devised a system in which, in a case where a user terminal receives a beacon signal transmitted by a beacon transmission device installed in a facility such as, for example, a shop, a server is notified of an ID of the relevant beacon transmission device and a service provided by the relevant server is received. Related technologies are disclosed in Japanese Laid-open Patent Publication No. 2014-135746, International Publication Pamphlet No. WO 200901680, Japanese Laid-open Patent Publication No. 2012-104892, and Japanese National Publication of International Patent Application No. 2010-531078.

SUMMARY

According to an aspect of the invention, an information processing method, performed by a computer configured to receive a beacon signal from a transmission source, includes: executing, by a processor of the computer, a calculation processing operation that includes calculating a length of a monitoring period, based on time intervals at which the beacon signal is received in a period of duration of a stationary state of the computer; and executing, by the processor of the computer, a determination processing operation that includes determining as being out of an area in proximity to the transmission source of the beacon signal in a case where the beacon signal is not received during the monitoring period having the length.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram illustrating an example of a beacon table;
FIG. 11 is a diagram illustrating an example of a service table;
FIG. 14 is a diagram illustrating an example of a reception log table;
FIG. 15 is a diagram illustrating an example of a determination log table;
FIG. 19 is a diagram illustrating an example of a first update log table;
FIG. 33 is a diagram illustrating an example of a second update log table.

DESCRIPTION OF EMBODIMENTS

Note that, in the present disclosure, a radio wave within an area in proximity to a beacon transmission device is not always uniform in strength. In a system utilizing a beacon, if a user terminal receives a beacon signal at least once within a period of time for monitoring the beacon signal, it is determined that the user terminal exists, during the period of time (the monitoring period), within the area associated with the beacon transmission device. In other words, if the user terminal receives no beacon signal within the monitoring period, it is determined that the user terminal exists outside the area associated with the beacon transmission device.

In a case of lengthening a predefined monitoring period, the probability of overlooking existing within the area is decreased. In this regard, however, a timing of sensing moving out of the area is delayed. In other words, readiness is lower.

On the other hand, in a case of setting a short monitoring period, the probability of erroneous sensing is increased while the readiness becomes higher.

If the possibility of poor reception in an environment in which the beacon transmission device is installed varies depending on, for example, a time zone, a problem of the deterioration of the readiness or sensing performance occurs in a time zone even in a case of setting a long monitoring period or even in a case of inversely setting a short monitoring period.

One aspect, an object of the present technology is to adjust, in accordance with a situation, the length of a monitoring period for presence-in-area determination.

First Embodiment

Figure 1:
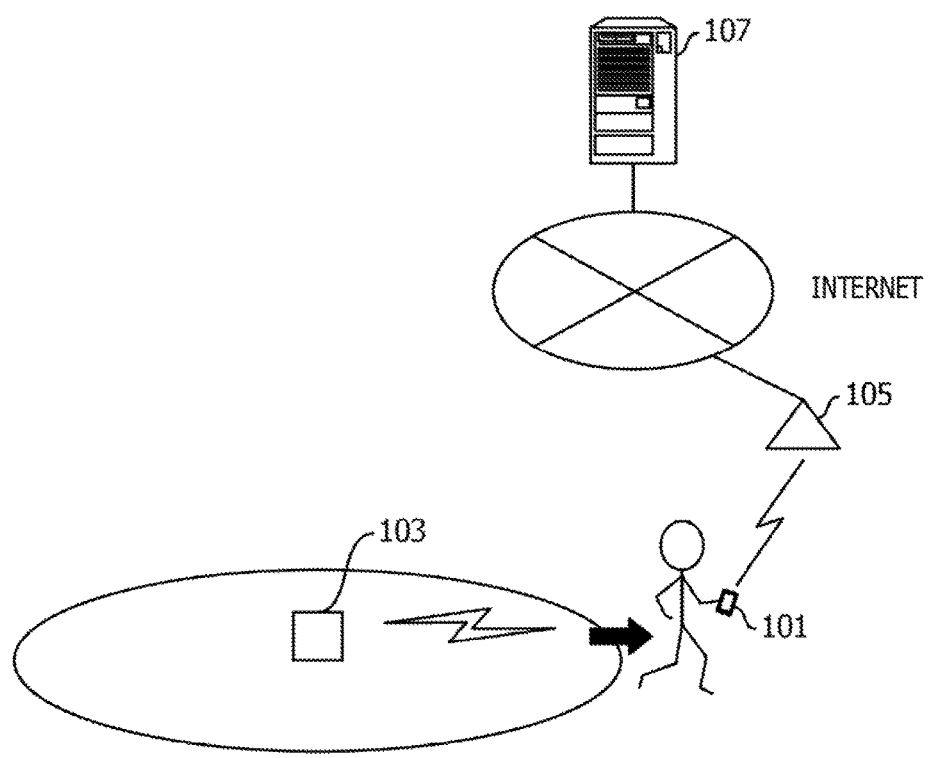
FIG. 1 is a diagram illustrating an example of a configuration of a system.

FIG. 1 illustrates an example of a configuration of a system in the present embodiment. A user holds a portable user terminal 101 such as, for example, a smartphone. A beacon transmission device 103 intermittently transmits a beacon signal. The beacon signal having a predetermined strength is received by the user terminal 101 located about 10 meters therefrom, for example. The beacon signal is called an advertisement signal, in some cases. An ellipse indicates an edge of a range (hereinafter, called a proximity area) within which the beacon signal is reachable. Note that it is assumed that the user terminal 101 has a function of being coupled to the Internet via a wireless LAN.

Here, a case where the user moves out of the proximity area is assumed. At a time when the beacon signal does not arrive, the user terminal 101 determines that a state is switched from "within an area" to "out of area". In addition, via an access point 105, a server 107 is notifies that switching to "out of area" occurs. It is assumed that the server 107 provides, to the user terminal 101 switched to "out of area", a service such as, for example, a message notification.

Figure 2:
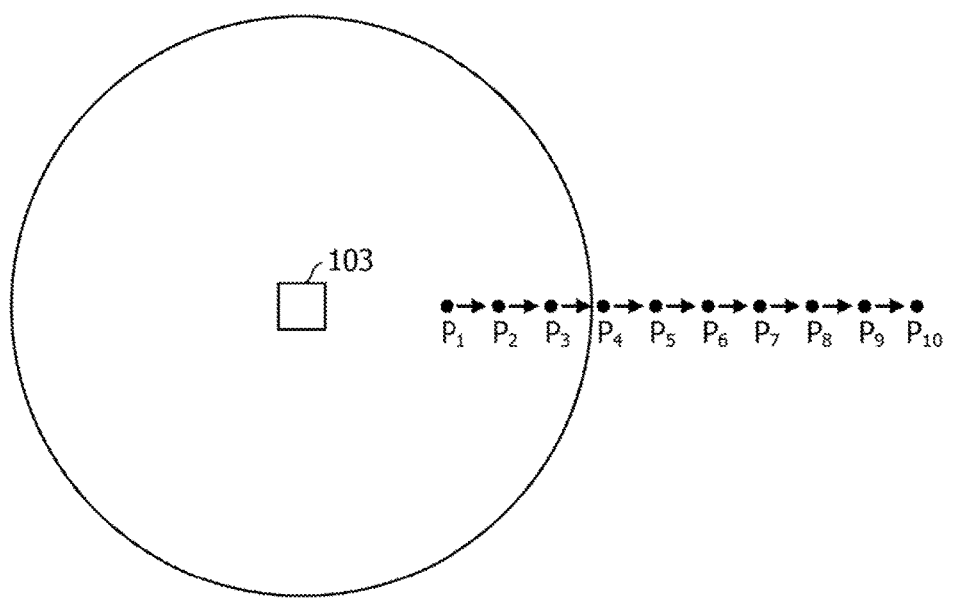
FIG. 2 is a diagram illustrating an example of a movement of a user terminal.

FIG. 2 illustrates an example of a movement of the user terminal 101. P1 to P10 indicate a trajectory along which the user moves. In this example, the position P1 to the position P3 correspond to the inside of the proximity area. The position P4 to the position P10 correspond to the outside of the proximity area. In other words, in a stage of moving from the position P3 to the position P4, the user turns out to move out of the proximity area.

Figure 3:
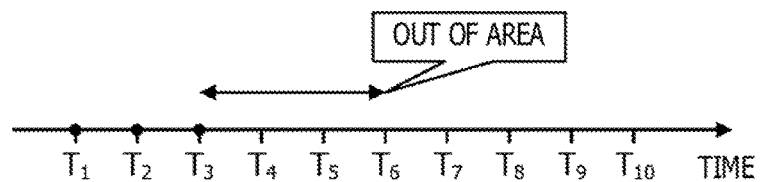
FIG. 3 is a diagram illustrating an example of reception of a beacon signal, performed by the user terminal.

FIG. 3 illustrates an example of reception of the beacon signal in the example illustrated in FIG. 2. T1 to T10 indicate times at which the user is situated at the positions P1 to P10, respectively. Circles indicate that the beacon signal is received at the respective times. At the times T1 to T3, the user terminal 101 receives the beacon signal stronger than a predetermined reference value. On the other hand, at the times T4 to T10, the user terminal 101 receives no beacon signal stronger than the predetermined reference value.

A straight line to which arrows are assigned indicates the monitoring period. In a case where no beacon signal is received within the monitoring period the starting point of which is a timing of finally receiving the beacon signal, it is determined that the user terminal 101 is switched to "out of area". In this example, since no beacon signal is received between the time T3 and the time T6, "out of area" turns out to be sensed at the time T6. Since, at this time, the user is situated at the position P6, this sensing result is correct.

Figure 4:
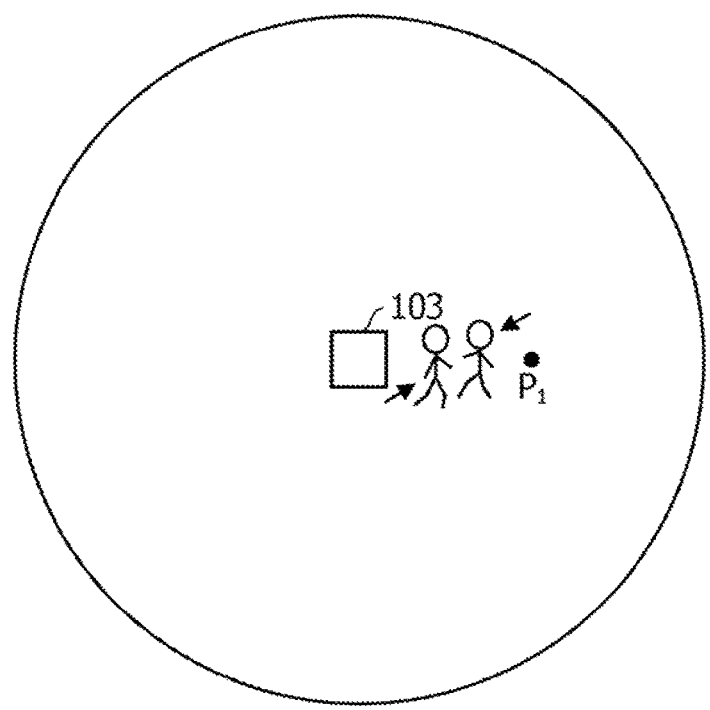
FIG. 4 is a diagram illustrating an example of poor reception.

On the other hand, even in a case where the user terminal 101 is situated close to the beacon transmission device 103, the strength of the received beacon signal becomes low, in some cases. FIG. 4 illustrates an example of an occurrence of poor reception. In this example, there is assumed a state in which there is a lot of traffic within the proximity area and visitors fill a space with the beacon transmission device 103, thereby making it difficult for a radio wave to penetrate. It is assumed that the number of cases of beacon signals difficult to receive is increased even in a case where the user stands in, for example, the position P1 within the proximity area.

Figure 5:
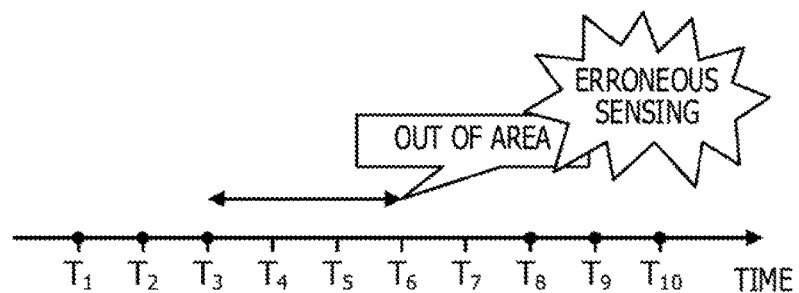
FIG. 5 is a diagram illustrating an example of reception of the beacon signal, performed by the user terminal.

FIG. 5 illustrates an example of reception of the beacon signal, based on such an assumption. In this example, it is assumed that since visitors block the radio wave between the time T4 and the time T7, it is difficult for the user terminal 101 to receive the beacon signal. Since, in such a case, no beacon signal is received within the monitoring period, the user terminal 101 senses "out of area". At the time T6 when "out of area" is sensed in this example, the user is situated within the proximity area. Therefore, erroneous sensing turns out to occur.

Figure 6:
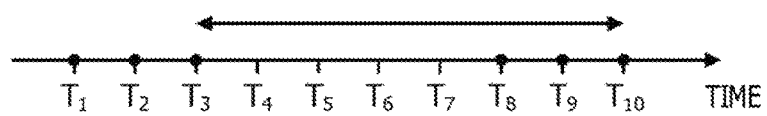
FIG. 6 is a diagram illustrating an example of reception of the beacon signal, performed by the user terminal.

As a measure to avoid such erroneous sensing, it is conceivable that the monitoring period is lengthened. FIG. 6 illustrates an example in a case of setting the lengthened monitoring period. In FIG. 6, as illustrated by a straight line to which arrows are assigned, the lengthened monitoring period is set. Therefore, a period between the time T3 at which the beacon signal is finally received and the time T10 corresponds to the monitoring period. In addition, since the beacon signal is received at the time T8, a state of "out of area" does not occur. In other words, a state of "within an area" is correctly maintained.

Figure 7:
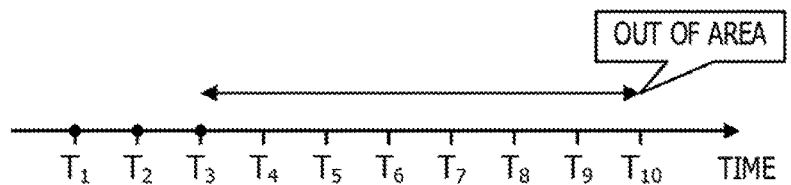
FIG. 7 is a diagram illustrating an example of reception of the beacon signal, performed by the user terminal.

In this regard, however, in a case of setting the lengthened monitoring period, a timing of sensing "out of area" is delayed in a case where the user moves out of the proximity area as illustrated in FIG. 2. FIG. 7 illustrates that state. While "out of area" turns out to be sensed at the time T10 corresponding to the ending point of the monitoring period, an elapsed time after the time T4 at which moving out of the proximity area occurs is long. In a case where the readiness is lower in this way, a state in which it is difficult to provide an intended service, in some cases. In a case of sending a message giving notice of, for example, a thing left behind, a distance by which the user turns back becomes long.

In the present embodiment, a state in which the user stands at a point as illustrated in FIG. 4 is assumed, and a period during which no beacon signal arrives is measured in a case where the user terminal 101 is put into a stationary state. In addition, based on that period, the monitoring period is set again. By doing so, in accordance with, for example, the degree of traffic, it is possible to adjust the monitoring period to an adequate length. Specifically, in a case where the proximity area is crowded, the number of cases of erroneously sensing "out of area" is reduced. In addition, in a case where the proximity area is not crowded, "out of area" turns out to be sensed more quickly. Note that, in addition of the influence of a human body, the ease of receiving a radio wave varies depending on transmission and reflection characteristics of a radio wave in a structure, in some cases. In addition, the length of a sending cycle in the cycle beacon transmission device 103 influences the reception frequency of the beacon signal in some cases. This is the end of an explanation of an outline in the present embodiment.

Figure 8:
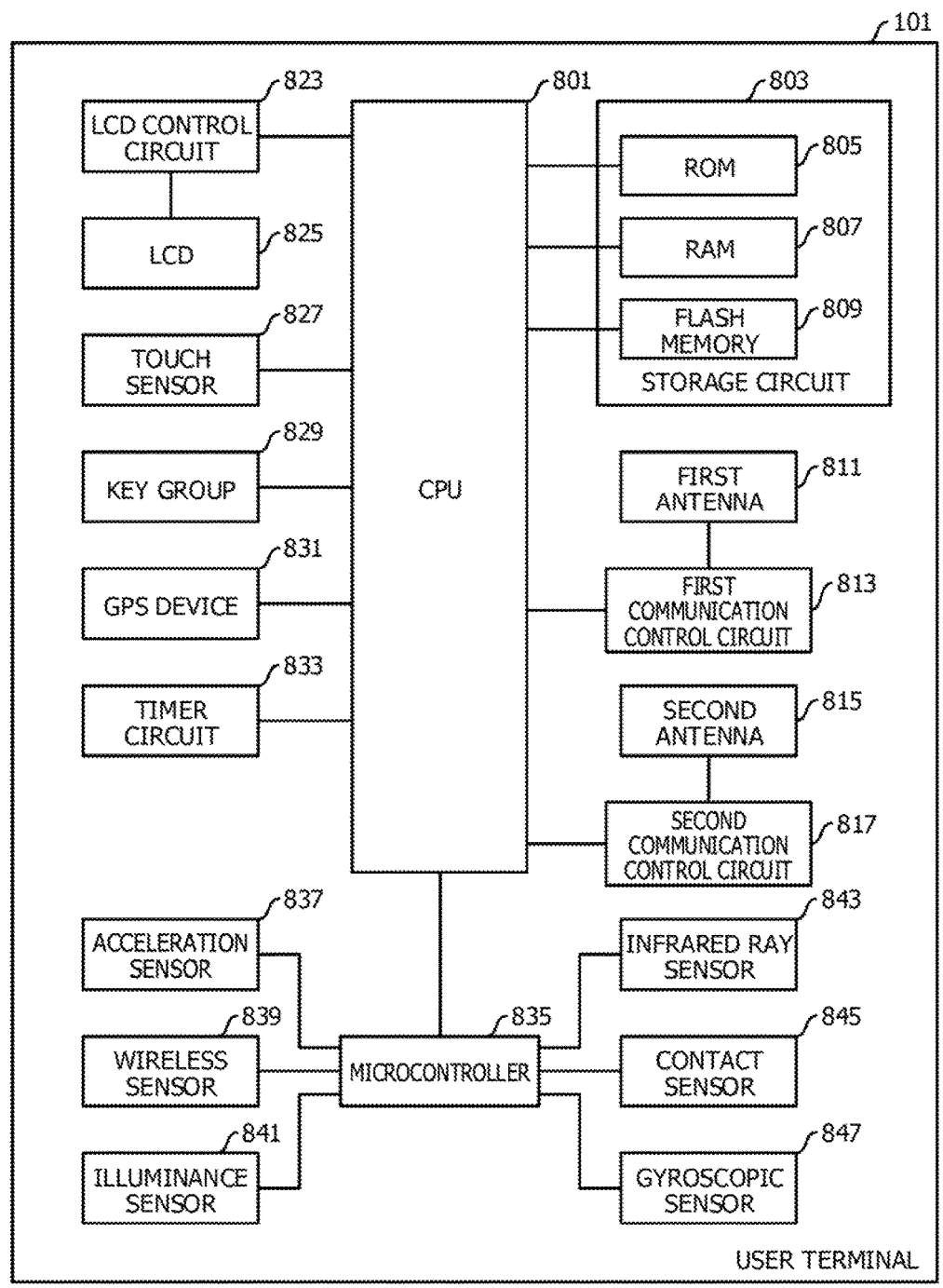
FIG. 8 is a diagram illustrating an example of a hardware configuration of the user terminal.

Hereinafter, an operation of the user terminal 101 will be described. First, a hardware configuration of the user terminal 101 in the present embodiment will be described. FIG. 8 illustrates an example of the hardware configuration of the user terminal 101.

The user terminal 101 includes a central processing unit (CPU) 801, a storage circuit 803, a first antenna 811, a first communication control circuit 813, a second antenna 815, a second communication control circuit 817, a liquid crystal display (LCD) control circuit 823, an LCD 825, a touch sensor 827, a key group 829, a global positioning system (GPS) device 831, a timer circuit 833, a microcontroller 835, an acceleration sensor 837, a wireless sensor 839, an illuminance sensor 841, an infrared ray sensor 843, a contact sensor 845, and a gyroscopic sensor 847.

The CPU 801 executes programs stored in the storage circuit 803. The storage circuit 803 includes a read only memory (ROM) 805, a random access memory (RAM) 807, and a flash memory 809, for example. The ROM 805 stores therein a basic program and initial data, for example. The RAM 807 includes an area for deploying a program. The RAM 807 further includes an area for storing temporary data. The flash memory 809 stores therein programs such as applications and user data, for example.

The LCD control circuit 823 causes a clock circuit to operate at a predetermined operating frequency, thereby causing the LCD 825 to be driven. The LCD 825 displays various kinds of screens. The touch sensor 827 is a panel-shaped sensor arranged on a display surface of the LCD 825 and receives instructions based on touch operations, for example. Specifically, a touch panel obtained by integrating the LCD 825 and the touch sensor 827 is used. Individual hard keys of the key group 829 are arranged in a portion of a chassis.

The first antenna 811 receives wireless radio waves based on a wireless local area network (LAN) system. The first communication control circuit 813 controls wireless communication in accordance with a usable frequency in the wireless LAN method. The second antenna 815 receives wireless radio waves based on a short distance communication method (for example, the Bluetooth (registered trademark) Low Energy method). The second communication control circuit 817 controls wireless communication in accordance with a usable frequency in the short distance communication method. Note that, in this example, it is assumed that the beacon signal is transmitted based on the short distance communication method. In this regard, however, the present embodiment may be applied to a case of transmitting, based on another method, the beacon signal.

The microcontroller 835 is coupled to the CPU 801. Various kinds of sensors are coupled to the microcontroller 835. In addition, the microcontroller 835 controls the various kinds of sensors. The CPU 801 acquires measurement results of the various kinds of sensors via the microcontroller 835.

The acceleration sensor 837 measures an acceleration. Specifically, the acceleration sensor 837 measures an acceleration in each of directions of three axes perpendicular to one another. Measurement results of the acceleration sensor 837 are used for detecting a stationary state. The wireless sensor 839 includes a circuit to control the antennas and short distance wireless communication, for example. The wireless sensor 839 may receive the beacon signal.

The illuminance sensor 841 measures illuminance. The infrared ray sensor 843 measures an infrared ray. The contact sensor 845 detects a state of being in contact with an object. The gyroscopic sensor 847 measures an attitude of the user terminal 101. A measurement result of the gyroscopic sensor 847 may be used for detecting the stationary state.

Note that the user terminal 101 may be a mobile phone device other than the smartphone. In addition, the user terminal 101 may be a portable electronic device other than the mobile phone device. The present embodiment may be applied in a portable electronic device, examples of which include wristwatch-type and eyeglass-type wearable terminals, a tablet terminal, a game machine, a pedometer, a sound recorder, a music player, a camera, an image reproducer, a television broadcast receiver, a radio broadcast receiver, a controller, an electronic clock, an electronic dictionary, an electronic translator, a transceiver, a GPS transmitter, a measuring equipment, a health support equipment, and a medical equipment.

Figure 9:
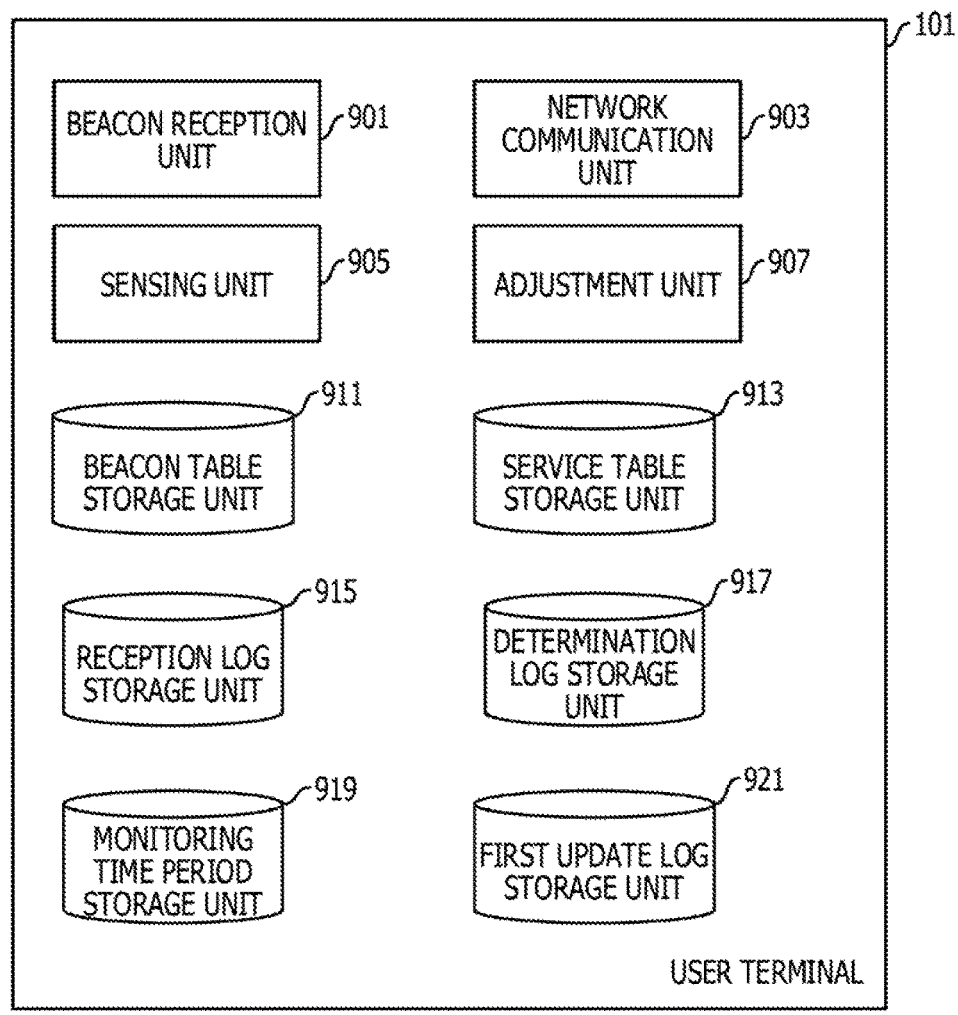
FIG. 9 is a diagram illustrating an example of a module configuration of the user terminal.

FIG. 9 illustrates an example of a module configuration of the user terminal 101. The user terminal 101 includes a beacon reception unit 901, a network communication unit 903, a sensing unit 905, an adjustment unit 907, a beacon table storage unit 911, a service table storage unit 913, a reception log storage unit 915, a determination log storage unit 917, a monitoring time period storage unit 919, and a first update log storage unit 921.

The beacon reception unit 901 performs processing for receiving the beacon signal. The network communication unit 903 controls network communication. The sensing unit 905 senses a status (whether "within an area" or "out of area). The adjustment unit 907 adjusts the length of the monitoring period (hereinafter, called a monitoring time period).

The beacon table storage unit 911 stores therein a beacon table. The beacon table will be described later by using FIG. 10. The service table storage unit 913 stores therein a service table. The service table will be described later by using FIG. 11. The reception log storage unit 915 stores therein a reception log table. The reception log table will be described later by using FIG. 14. The determination log storage unit 917 stores therein a determination log table. The determination log table will be described later by using FIG. 15. The monitoring time period storage unit 919 stores therein a current monitoring time period. The first update log storage unit 921 stores therein a first update log table. The first update log table will be described later by using FIG. 19.

The beacon reception unit 901, the network communication unit 903, the sensing unit 905, and the adjustment unit 907, described above, are realized by using hardware resources (for example, FIG. 8) and a program causing a processor to perform processing described below.

The beacon table storage unit 911, the service table storage unit 913, the reception log storage unit 915, the determination log storage unit 917, the monitoring time period storage unit 919, and the first update log storage unit 921, described above, are realized by using hardware resources (for example, FIG. 8).

FIG. 10 illustrates an example of a beacon table. The beacon table in this example includes records corresponding to the respective beacon transmission devices 103. The records of the beacon table each include a field in which a beacon ID is stored, a field in which a service name is stored, a field in which a geographical location is stored, and a field in which a facility type is stored.

The beacon ID identifies a corresponding one of the beacon transmission devices 103. The service name identifies a service utilizing the corresponding one of the beacon transmission devices 103. The geographical location identifies a location (for example, a latitude and a longitude) at which the corresponding one of the beacon transmission devices 103 is installed. The facility type classifies a facility in which the corresponding one of the beacon transmission devices 103 is installed. Note that it is assumed that a content of the beacon table is preliminarily set.

FIG. 11 illustrates an example of a service table. The service table in this example includes records corresponding to respective services. The records of the service table each include a field in which a service name is stored and a field in which a response coefficient is stored. The service name identifies a corresponding one of services. The response coefficient is an indicator of readiness desired in the corresponding one of services. Note that it is assumed that a content of the service table is preliminarily set.

Figure 12:
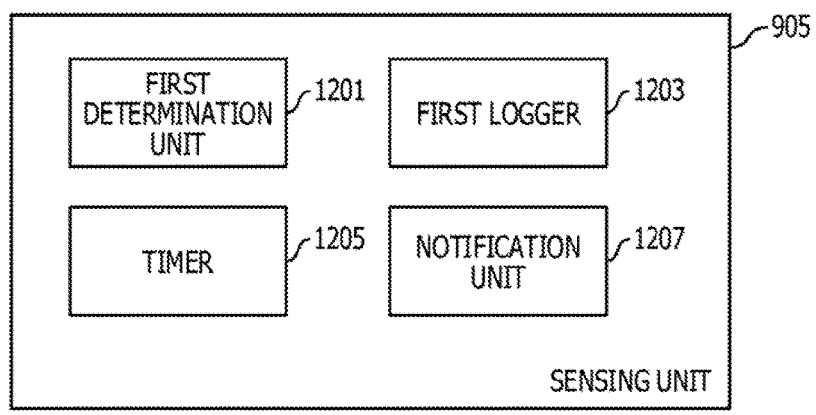
FIG. 12 is a diagram illustrating an example of a module configuration of a sensing unit.

Next, an operation of the sensing unit 905 will be described. FIG. 12 illustrates an example of a module configuration of the sensing unit 905. The sensing unit 905 includes a first determination unit 1201, a first logger 1203, a timer 1205, and a notification unit 1207.

The first determination unit 1201 determines a status. The first logger 1203 records therein a determination result of the status. The timer 1205 measures an elapsed time. The notification unit 1207 notifies the server 107 of the determination result of the status.

The first determination unit 1201, the first logger 1203, the timer 1205, and the notification unit 1207, described above, are realized by hardware resources (for example, FIG. 8) and a program causing a processor to perform processing described below.

Figure 13:
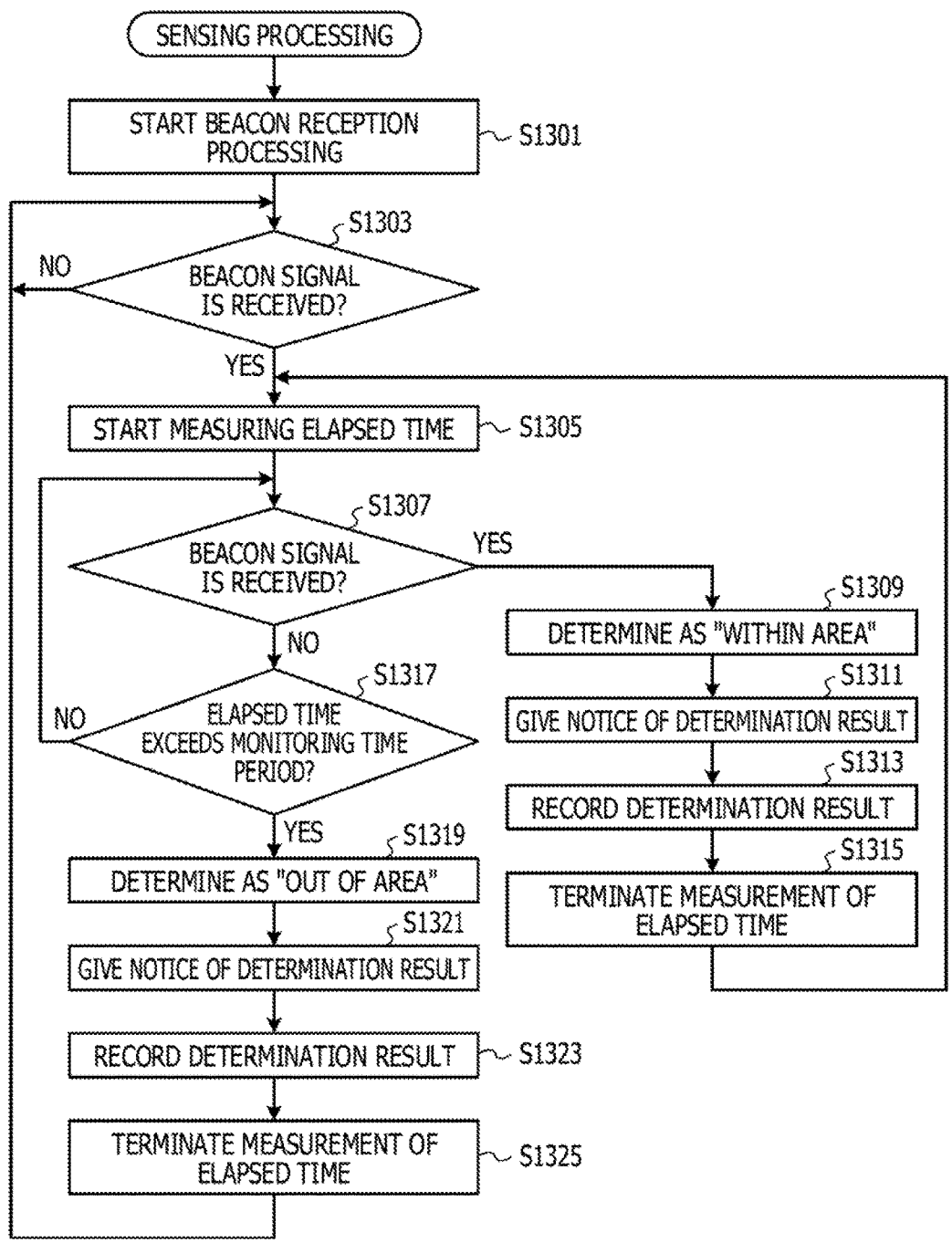
FIG. 13 is a diagram illustrating a sensing processing flow.

FIG. 13 illustrates a sensing processing flow. The sensing unit 905 starts beacon reception processing based on the beacon reception unit (S1301). In order to suppress power consumption, the beacon reception unit 901 controls the second communication control circuit 817 so that an operation for intermittently receiving the beacon signal is performed. In addition, in a case where the beacon signal is received in the beacon reception processing, the beacon reception unit 901 records a reception result in the reception log table.

FIG. 14 illustrates an example of a reception log table. The reception log table in this example includes records each corresponding to an opportunity at which one of beacon signals is received. The records of the reception log table each include a field in which a reception date and time is stored, a field in which a beacon ID is stored, a field in which a radio wave strength is stored, and a field in which a reception interval is stored.

The reception date and time identifies a timing at which a corresponding one of the beacon signals is received. The beacon ID identifies a corresponding one of the beacon transmission devices 103, which serves as a transmission source of the corresponding one of the beacon signals. The beacon ID is extracted from the corresponding one of the beacon signals. The radio wave strength indicates the strength of a radio wave at a time of receiving the corresponding one of the beacon signals. The reception interval indicates a time period that elapses from a point of time when a beacon signal related to a common beacon ID was previously received. In this example, the reception interval is obtained in calculation processing described later. In this regard, however, in the beacon reception processing, the reception interval may be obtained.

A description returns to an explanation of FIG. 13. The first determination unit 1201 determines whether or not a beacon signal is received (S1303). In a case where it is determined that no beacon signal is received, the processing operation in S1303 is repeated.

On the other hand, in a case where, in S1303, it is determined that a beacon signal is received, the timer 1205 starts measuring an elapsed time (S1305). In addition, the first determination unit 1201 determines whether or not a beacon signal is received (S1307). Note that it is assumed that the beacon signals serving as determination targets in S1303 and S1307 each include a common beacon ID. Beacon signals each including a different beacon ID do not serve as determination targets in S1303 and S1307.

In a case where, in S1307, it is determined that a beacon signal is received, the first determination unit 1201 determines that a current status is "within an area" (S1309). In a case where the status is switched from "out of area" to "within an area", the notification unit 1207 gives notice of a determination result (S1311). The determination result includes the status indicating "within an area", an ID of a corresponding one of the user terminals 101, and the beacon ID extracted from the beacon signal.

In addition, in a case where the status is switched from "out of area" to "within an area", the first logger 1203 records the determination result in the determination log table (S1313). Specifically, in the determination log table, a new record is generated.

FIG. 15 illustrates an example of a determination log table. The determination log table in this example includes records each corresponding to an opportunity at which a status is switched. The records of the determination log table each include a field in which a determination date and time is stored, a field in which a status is stored, and a field in which a beacon ID is stored.

The determination date and time identifies a timing at which the status is switched. The status indicates a switched state (one of "within an area" and "out of area"). The beacon ID identifies a transmission source of a beacon signal received in "within an area" or a transmission source of a beacon signal with which contact is lost in "out of area".

A description returns to an explanation of FIG. 13. The timer 1205 terminates measurement of the elapsed time once (S1315). In addition, the processing returns to the processing operation illustrated in S1305, and the above-mentioned processing is repeated.

A description returns to an explanation of S1307. In a case where, in S1307, it is determined that no beacon signal is received, the first determination unit 1201 determines whether or not the elapsed time exceeds a monitoring time period stored in the monitoring time period storage unit 919 (S1317).

In a case where the elapsed time does not exceed the monitoring time period, the processing returns to the processing operation illustrated in S1307, and the above-mentioned processing is repeated.

On the other hand, in a case where, in S1317, it is determined that the elapsed time exceeds the monitoring time period, the first determination unit 1201 determines that the current status is "out of area" (S1319). In a case where the status is switched from "within an area" to "out of area", the notification unit 1207 gives notice of a determination result (S1321). The determination result includes the status indicating "out of area", the ID of the corresponding one of the user terminals 101, and the beacon ID of the beacon signal with which contact is lost. Note that the beacon ID may be omitted.

In addition, in a case where the status is switched from "within an area" to "out of area", the first logger 1203 records the determination result in the determination log table (S1323). Specifically, in the determination log table, a new record is generated.

The timer 1205 terminates measurement of the elapsed time (S1325). In addition, the processing returns to the processing operation illustrated in S1303, and the above-mentioned processing is repeated. This is the end of an explanation of the sensing processing.

Figure 16:
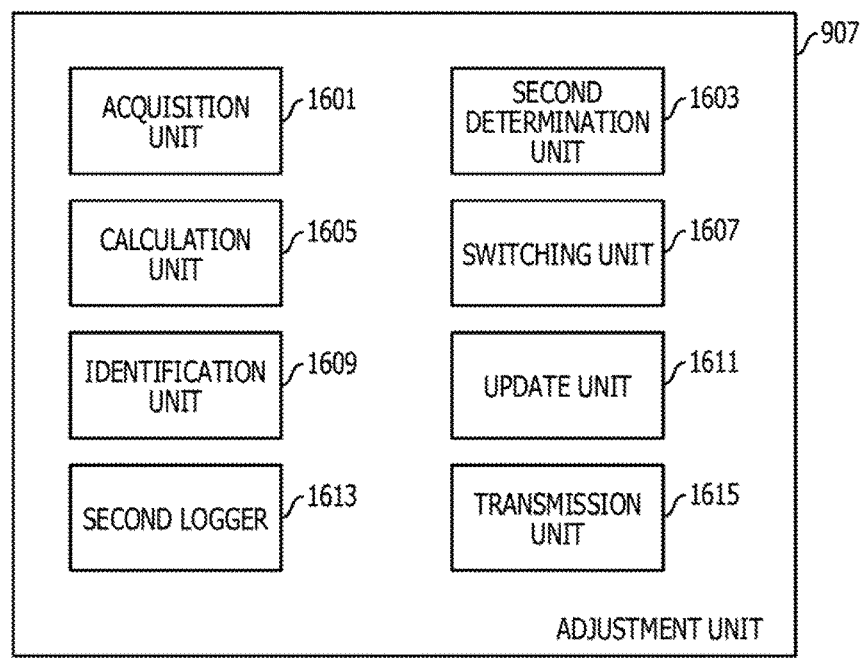
FIG. 16 is a diagram illustrating an example of a module configuration of an adjustment unit.

Next, an operation of the adjustment unit 907 will be described. FIG. 16 illustrates an example of a module configuration of the adjustment unit 907. The adjustment unit 907 includes an acquisition unit 1601, a second determination unit 1603, a calculation unit 1605, a switching unit 1607, an identification unit 1609, an update unit 1611, a second logger 1613, and a transmission unit 1615.

The acquisition unit 1601 acquires sensor data. The second determination unit 1603 determines whether or not being in a stationary state. The calculation unit 1605 calculates a monitoring time period. The switching unit 1607 switches between modes in the beacon reception processing. The identification unit 1609 identifies the monitoring time period. The update unit 1611 updates the monitoring time period. The second logger 1613 records an update result in the first update log table. The transmission unit 1615 transmits the update result in a third embodiment.

The acquisition unit 1601, the second determination unit 1603, the calculation unit 1605, the switching unit 1607, the identification unit 1609, the update unit 1611, the second logger 1613, and the transmission unit 1615, described above, are realized by using hardware resources (for example, FIG. 8) and a program causing a processor to perform processing described below.

Figure 17:
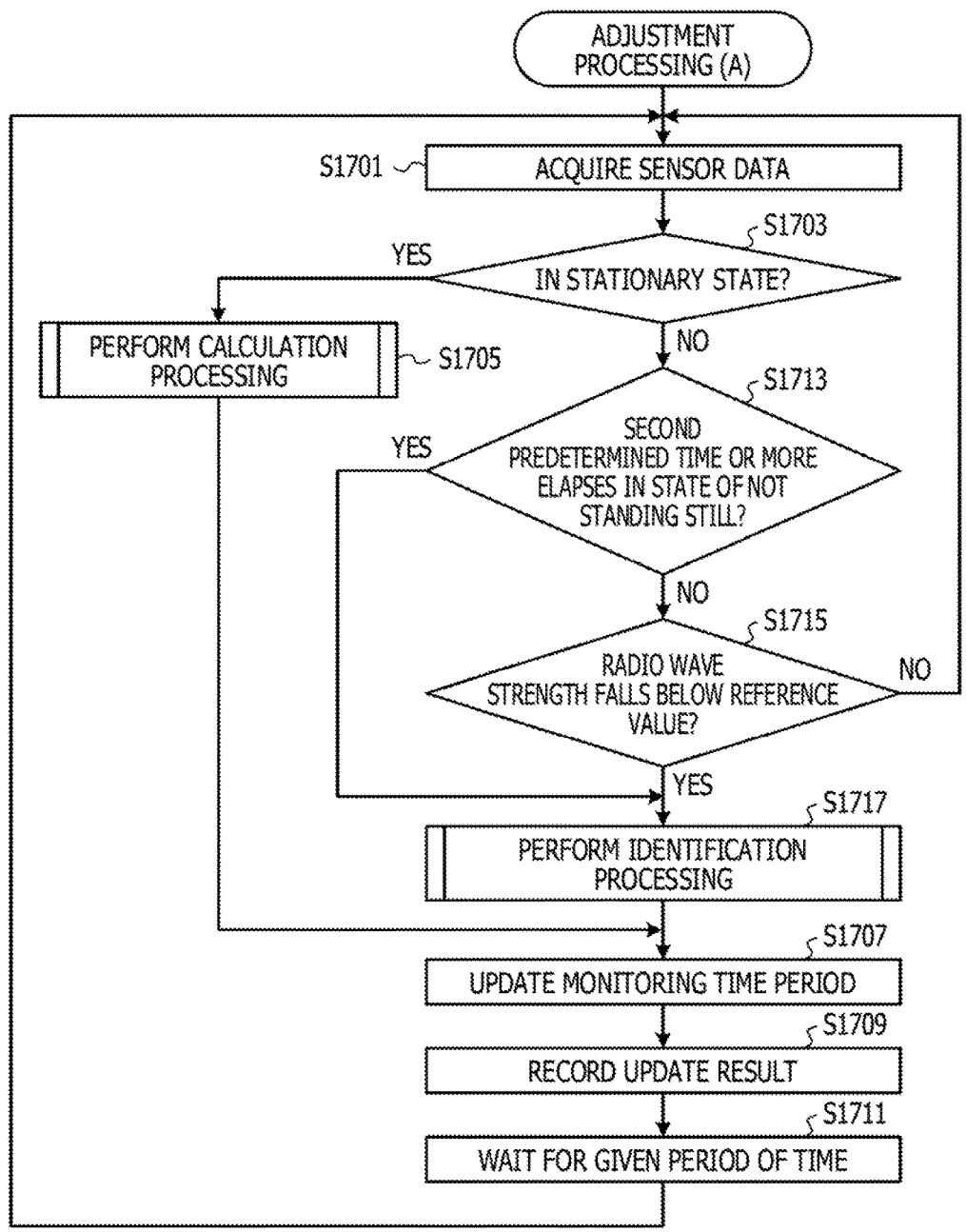
FIG. 17 is a diagram illustrating an adjustment processing flow.

In the present embodiment, adjustment processing (A) is performed. FIG. 17 illustrates an adjustment processing (A) flow. The acquisition unit 1601 acquires sensor data (S1701). Specifically, the sensor data is acceleration data measured by the acceleration sensor 837 and/or attitude data measured by the gyroscopic sensor 847.

Based on the sensor data, the second determination unit 1603 determines whether or not the user terminal 101 is in a stationary state (S1703). In a case where it is determined that the user terminal 101 is in the stationary state, the calculation unit 1605 performs calculation processing (S1705). In the calculation processing, a monitoring time period is calculated based on sampling.

In the present embodiment, calculation processing (A) is performed. The calculation processing (A) is based on a calculation formula of "Monitoring Time Period=Predetermined Coefficient×Maximum Value of Reception Intervals".

Figure 18:
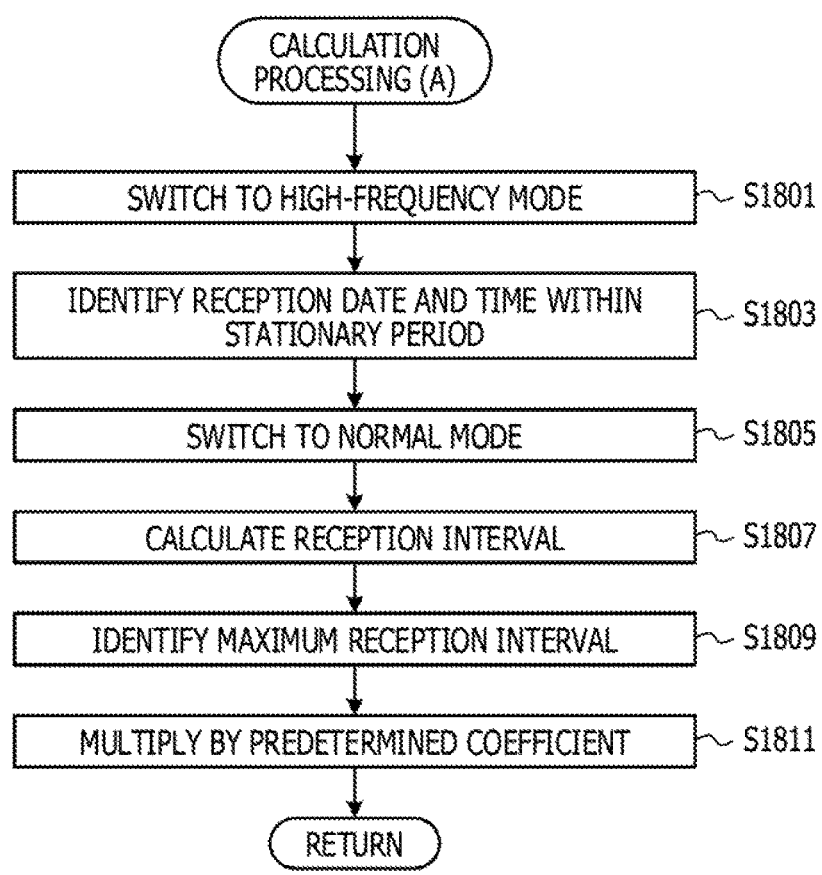
FIG. 18 is a diagram illustrating a calculation processing flow.

FIG. 18 illustrates a calculation processing (A) flow. The switching unit 1607 switches the beacon reception processing to a high-frequency mode (S1801). In other words, in the beacon reception processing based on the beacon reception unit 901, an operation of reception of a beacon signal is performed at a frequency higher than usual. In other words, a time interval of the reception operation is decreased.

The calculation unit 1605 identifies a reception date and time within a period of duration of the stationary state (hereinafter, called a stationary period) (S1803). This stationary period is a sampling period for the calculation processing. Reception dates and times serving as identification targets at this time are limited to those corresponding to the same beacon ID as those of the beacon signals serving as determination targets in S1303 and S1307 in FIG. 13.

The switching unit 1607 switches the beacon reception processing to a normal mode (S1805). In other words, in the beacon reception processing based on the beacon reception unit 901, the operation of reception of a beacon signal is performed at a usual frequency. In other words, a time interval of the reception operation is restored to the original.

Regarding each of the reception dates and times identified within the stationary period, the calculation unit 1605 calculates a reception interval (S1807). A pervious reception date and time is subtracted from a corresponding one of the reception dates and times, thereby obtaining the reception interval. In this example, the reception interval is stored in the reception log table.

From among reception intervals calculated in S1807, the calculation unit 1605 identifies a maximum reception interval (S1809). The calculation unit 1605 multiplies the maximum reception interval by a predetermined coefficient (S1811). In addition, an obtained product is defined as a monitoring period. In a case where the predetermined coefficient is greater than "1", correctness of sensing is likely to be increased while there is an aspect that readiness is likely to be decreased. Here, it is assumed that the predetermined coefficient is a value greater than "1".

In this regard, however, in a case of considering the readiness to be important, a value less than "1" may be used as the predetermined coefficient. In this case, there is an aspect that the correctness of sending is lower. In addition, the predetermined coefficient may be "1". In that case, S1811 is omitted, and a maximum reception interval may be defined as the monitoring period without change.

In a case where the calculation processing (A) finishes, the processing returns to the adjustment processing (A) serving as a call source.

A description returns to an explanation of FIG. 17. The update unit 1611 updates the monitoring time period stored in the monitoring time period storage unit 919 (S1707). Note that, in a case where a difference between a current monitoring time period and the calculated monitoring time period is small, the update unit 1611 does not have to update the monitoring time period.

After updating the monitoring time period, the second logger 1613 records an update result in the first update log table (S1709).

FIG. 19 illustrates an example of a first update log table. The first update log table in this example includes records each corresponding to an opportunity at which the monitoring time period is updated in a corresponding one of the user terminals 101. The records of the first update log table each include a field in which an update date and time is stored, a field in which a beacon ID is stored, and a field in which a monitoring time period is stored.

The update date and time identifies a timing at which the monitoring time period is updated. The beacon ID identifies a transmission source of a beacon signal monitored by the relevant monitoring time period. The monitoring time period corresponds to an updated result.

A description returns to an explanation of FIG. 17. In a case where the processing operation in S1709 finishes, the acquisition unit 1601 waits for a given period of time (S1711). The reason is to reduce a processing load. In addition, returning to the processing operation illustrated in S1701, the above-mentioned processing is repeated.

A description returns to an explanation of S1703. In a case where, in S1703, it is determined that user terminal 101 is not in the stationary state, the second determination unit 1603 determines whether or not a second predetermined time or more elapses in a state of not standing still (S1713). Here, it is assumed that a certain amount of time elapses while a user does not stand still. In such a case, the monitoring time period is re-evaluated.

In addition, in a case where the second predetermined time or more does not elapse in a state of not standing still, the second determination unit 1603 determines whether or not a radio wave strength falls below a reference value (S1715). Here, it is assumed that the user moves close to the vicinity of a boundary of a proximity area while not standing still. In such a case, the monitoring time period is re-evaluated.

Note that, in a case where the radio wave strength does not fall below the reference value, the processing returns to the processing operation illustrated in S1701, and the above-mentioned processing is repeated.

On the other hand, in a case where, in S1713, it is determined that the second predetermined time or more elapses in a state of not standing still or in a case where, in S1715, it is determined that the radio wave strength falls below the reference value, the identification unit 1609 performs identification processing (S1717). In the identification processing, the monitoring time period is identified by using a method different from that of the calculation processing.

In the present embodiment, identification processing (A) is performed. In the identification processing (A), a monitoring time period previously set for the same beacon ID is referenced.

Figure 20:
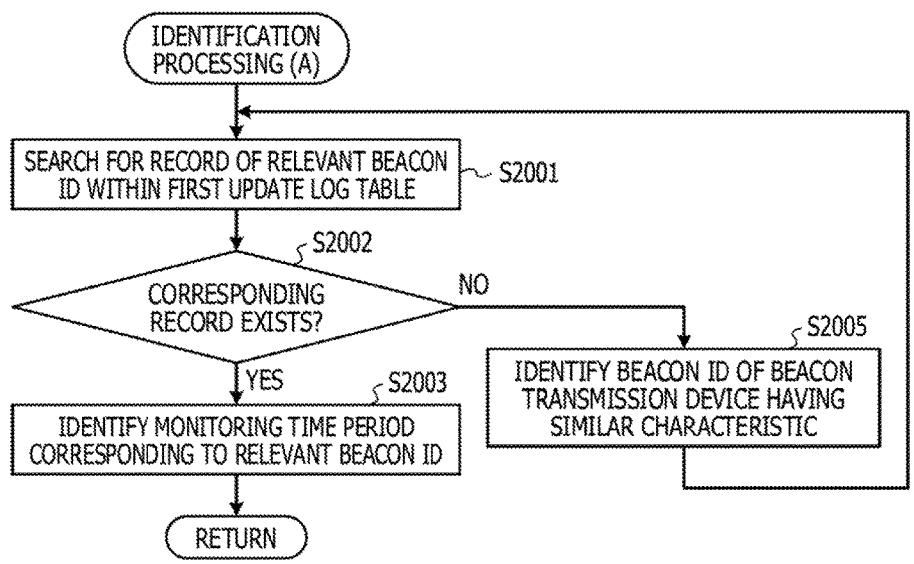
FIG. 20 is a diagram illustrating an identification processing flow.

FIG. 20 illustrates an identification processing (A) flow. Within the first update log table, the identification unit 1609 searches for a record in which the beacon ID of the beacon signals serving as determination targets in S1303 and S1307 in FIG. 13 is stored (S2001).

The identification unit 1609 determines whether or not the corresponding record exists (S2002). In a case where it is determined that the corresponding record exists, the identification unit 1609 identifies a monitoring time period corresponding to the relevant beacon ID (S2003). Specifically, the identification unit 1609 reads the monitoring time period set in the record identified by the above-mentioned search.

In a case where, in S2001, records are found, the identification unit 1609 may select a record including the latest update date and time. Alternatively, the identification unit 1609 may select a record including an update date and time related to a time close to the current moment, in other words, an update date and time in the same time zone.

On the other hand, in a case where, in S2002, it is determined that the corresponding record does not exist, the identification unit 1609 identifies a beacon ID of the beacon transmission device 103 having a similar characteristic (S2005). Based on the beacon table, the identification unit 1609 identifies a beacon ID situated in a nearby geographical location, for example. Alternatively, based on the beacon table, the identification unit 1609 may identify a beacon ID sharing a common facility type. In addition, the processing returns to S2001, and a record of the beacon ID identified in S2005 is searched for.

In a case where the identification processing (A) finishes, the processing returns to the adjustment processing (A) serving as a call source.

A description returns to an explanation of FIG. 17. In a case where the identification processing finishes, the processing returns to the processing operation in S1707. The processing operations in and after S1707 are as described above. Note that the processing operations in S1713 to S1717 may be omitted and the processing may return to the processing operation in S1701 via a NO route of S1703. Alternatively, the processing operation in S1715 may be omitted, and the processing may return to the processing operation in S1701 via the NO route of S1713. Alternatively, in a case where, in S1715, the radio wave strength falls below the reference value two or more times in a row, an YES route may be followed. This is the end of an explanation of the adjustment processing (A).

According to the present embodiment, depending on a situation, it is possible to adjust the monitoring time period for presence-in-area determination. There is an aspect that it is possible to achieve a balance between the readiness and the sensing performance.

In addition, since an operation mode of beacon reception in a sampling period is switched to a frequency higher than usual, it is possible to adjust the monitoring time period with a higher degree of accuracy.

In addition, regarding a beacon signal related to the same beacon ID, a previously calculated monitoring time period is identified. Therefore, even in a case where it is difficult to understand a current situation, it is possible to adjust the monitoring time period, based on an estimated situation.

In addition, in a case where previously calculated monitoring time periods are stored, a monitoring time period based on reception intervals of a beacon signal having a near reception time is identified. Therefore, it is possible to estimate a situation, based on a time zone.

In addition, in a case where previously calculated monitoring time periods are stored, a monitoring time period based on reception intervals of a latest beacon signal is identified. Therefore, it is possible to adjust the length of the monitoring period, based on a temporally close situation.

In addition, in a case where a reception state varies along with, for example, a movement of the user, it is possible to re-evaluate the monitoring time period.

In addition, in a case where it is difficult for a radio wave to arrive in the vicinity of, for example, a boundary of a proximity area, it is possible to re-evaluate the monitoring time period.

In addition, since the monitoring time period is calculated based on a maximum value of reception intervals, it is easy to set a monitoring period corresponding to an undesirable situation.

In addition, regarding a beacon signal from another transmission source having a similar characteristic, a previously calculated monitoring time period is identified. Therefore, it is possible to estimate a monitoring period correct to some degree.

Second Embodiment

Examples of calculation processing other than the calculation processing (A) will be described.

In place of the above-mentioned calculation processing (A), calculation processing (B) may be performed. The calculation processing (B) is based on "Monitoring Time Period=Predetermined Coefficient×Variance of Reception Intervals×Maximum Value of Reception Intervals".

Figure 21:
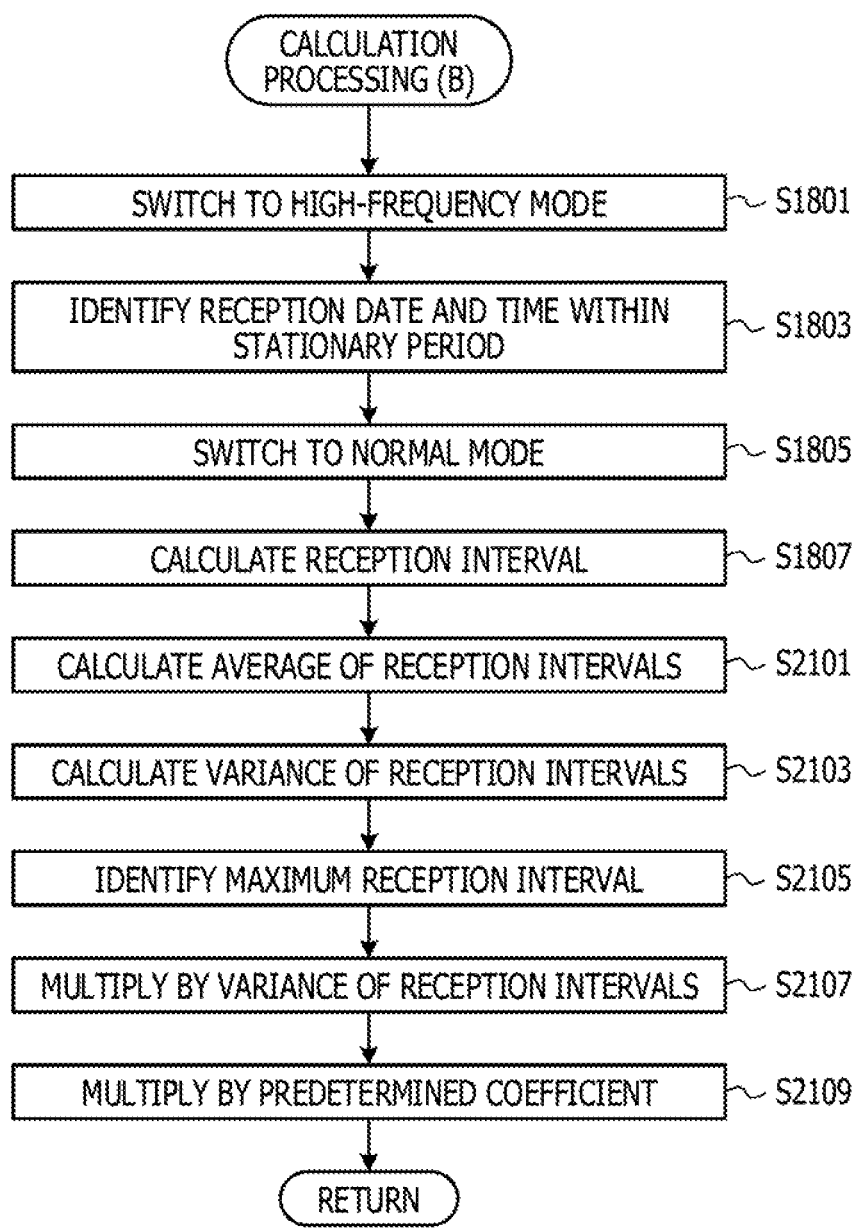
FIG. 21 is a diagram illustrating a calculation processing flow.

FIG. 21 illustrates a calculation processing (B) flow. Processing operations illustrated in S1801 to S1807 are the same as those in a case of FIG. 18.

The calculation unit 1605 calculates an average of reception intervals (S2101). Based on the relevant average, the calculation unit 1605 calculates variance of reception intervals (S2103). The calculation unit 1605 identifies a maximum reception interval (S2105). The calculation unit 1605 multiplies the maximum reception interval by the variance of reception intervals (S2107). The calculation unit 1605 multiplies a product obtained in S2107 by a predetermined coefficient (S2109). In addition, a product obtained in S2109 is defined as the monitoring time period. In a case where the calculation processing (B) finishes, the processing returns to the adjustment processing (A) serving as a call source.

In addition, in place of the above-mentioned calculation processing (A), calculation processing (C) may be performed. The calculation processing (C) is based on "Monitoring Time Period=Predetermined Coefficient×Response Coefficient Related to Service×Maximum Value of Reception Interval".

Figure 22:
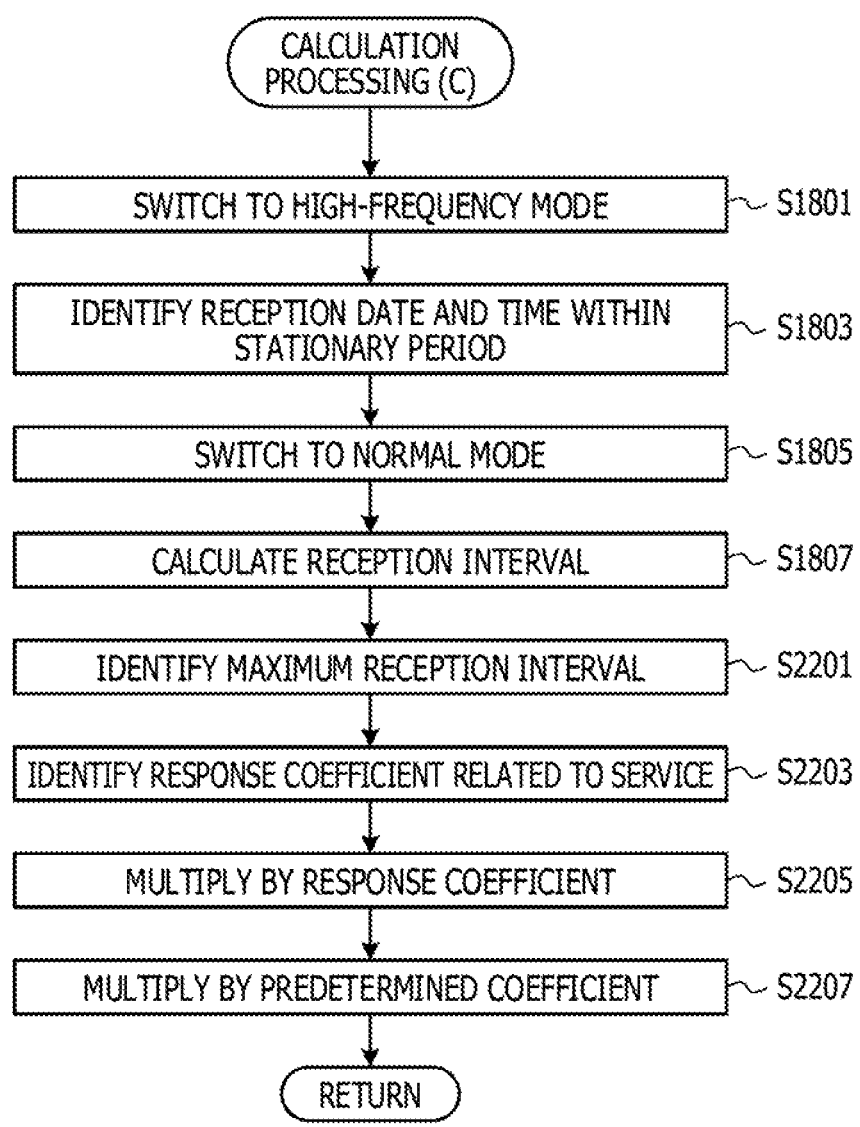
FIG. 22 is a diagram illustrating a calculation processing flow.

FIG. 22 illustrates a calculation processing (C) flow. Processing operations illustrated in S1801 to S1807 are the same as those in a case of FIG. 18.

The calculation unit 1605 identifies a maximum reception interval (S2201). Furthermore, the calculation unit 1605 identifies a response coefficient related to a service (S2203). Specifically, the calculation unit 1605 identifies, in the beacon table, a service name corresponding to the beacon ID of the beacon signals serving as determination targets in S1303 and S1307 in FIG. 13. Next, the calculation unit 1605 identifies, in the service table, a response coefficient corresponding to the service name. A decrease in the response coefficient means that a more rapid response is desired. An increase in the response coefficient means that reliability is demanded compared with readiness.

The calculation unit 1605 multiplies the maximum reception interval by the response coefficient (S2205). The calculation unit 1605 multiplies a product obtained in S2205 by a predetermined coefficient (S2207). In addition, a product obtained in S2207 is defined as the monitoring time period. In a case where the calculation processing (C) finishes, the processing returns to the adjustment processing (A) serving as a call source.

In addition, in place of the above-mentioned calculation processing (A), calculation processing (D) may be performed. The calculation processing (D) is based on "Monitoring Time Period=Predetermined Coefficient×Congestion Coefficient of Radio Wave×Maximum Value of Reception Intervals".

Figure 23:
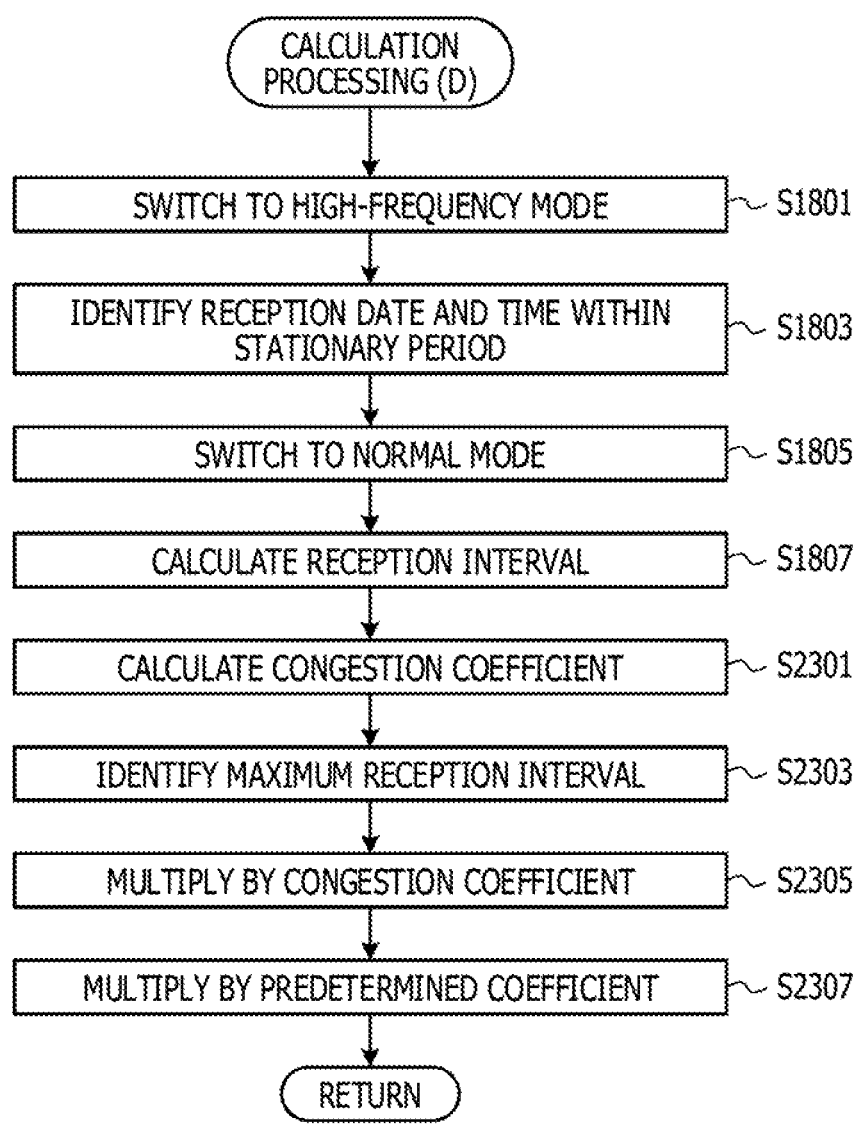
FIG. 23 is a diagram illustrating a calculation processing flow.

FIG. 23 illustrates a calculation processing (D) flow. Processing operations illustrated in S1801 to S1807 are the same as those in a case of FIG. 18.

The calculation unit 1605 calculates a congestion coefficient of a radio wave (S2301). Specifically, the calculation unit 1605 obtains the total number of beacon signals received within a stationary period (transmission sources are not considered). This total number is divided by the number of beacon signals serving as determination targets. An obtained quotient is defined as the congestion coefficient of the radio wave. The congestion coefficient increases with an increase in the number of beacon signals other than the determination targets.

The calculation unit 1605 identifies a maximum reception interval S2303). The calculation unit 1605 multiplies the maximum reception interval by the congestion coefficient of the radio wave (S2305). The calculation unit 1605 multiplies a product obtained in S2305 by a predetermined coefficient (S2307). In addition, a product obtained in S2307 is defined as the monitoring time period. In a case where the calculation processing (D) finishes, the processing returns to the adjustment processing (A) serving as a call source.

In addition to the above-mentioned examples, the monitoring time period may be calculated based on a calculation formula of "Monitoring Time Period=Predetermined Coefficient×Variances of Reception Intervals×Response Coefficient Related to Service×Maximum Value of Reception Intervals". The monitoring time period may be calculated based on a calculation formula of "Monitoring Time Period=Predetermined Coefficient×Variance of Reception Intervals×Congestion Coefficient of Radio Wave×Maximum Value of Reception Interval". The monitoring time period may be calculated based on a calculation formula of "Monitoring Time Period=Predetermined Coefficient×Response Coefficient Related to Service×Congestion Coefficient of Radio Wave×Maximum Value of Reception Intervals". In addition, the monitoring time period may be calculated based on a calculation formula of "Monitoring Time Period=Predetermined Coefficient×Variance of Reception Intervals×Response Coefficient Related to Service×Congestion Coefficient of Radio Wave×Maximum Value of Reception Intervals".

Next, an example of calculating, based on an average of reception intervals, a monitoring time period will be described. In the following example, in a case where variance of reception intervals is less than a reference value, the average of reception intervals is used.

In place of the above-mentioned calculation processing (A), calculation processing (E) may be performed. The calculation processing (E) is based on "Monitoring Time Period=Predetermined Coefficient×Average of Reception Intervals".

Figure 24:
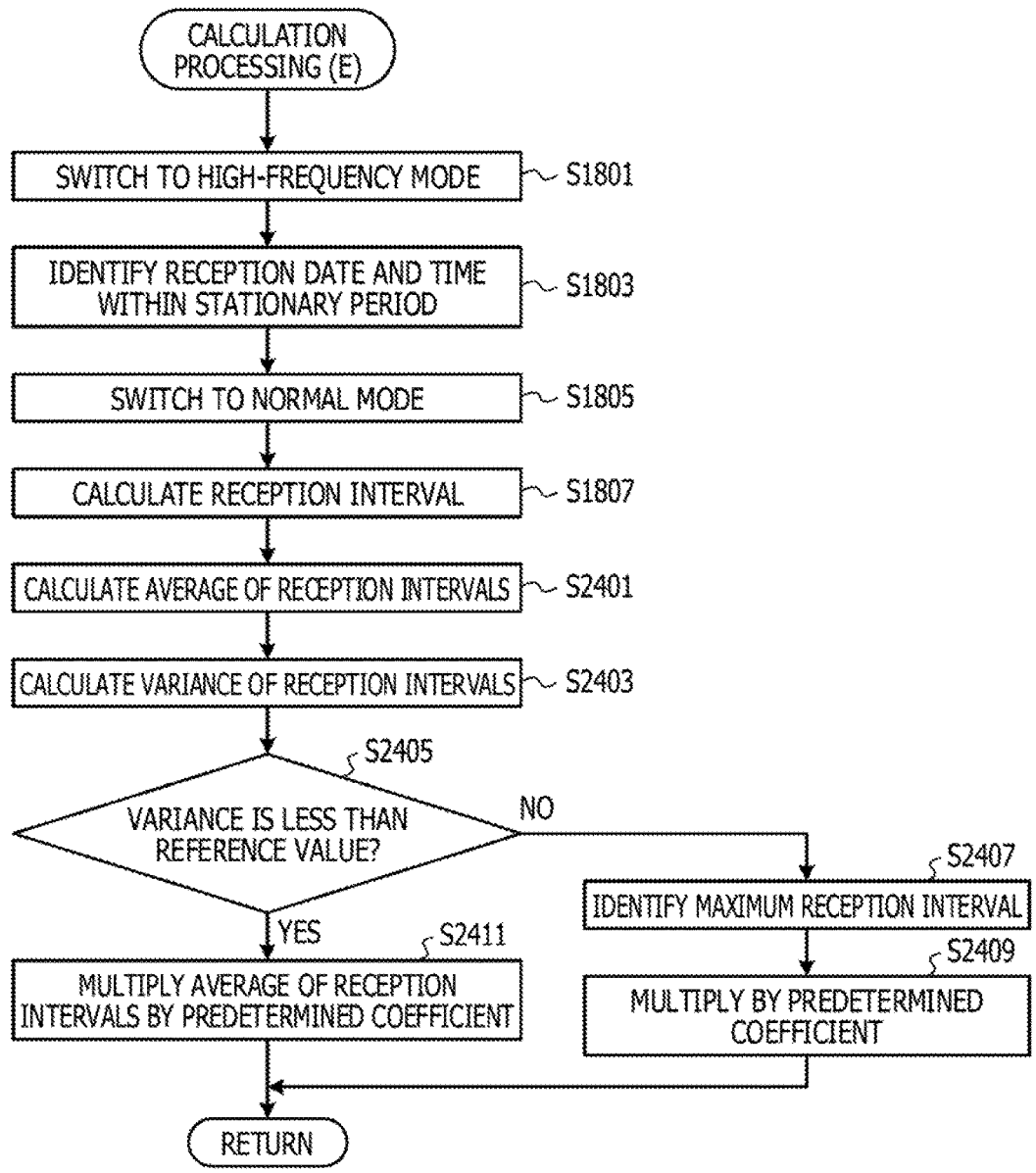
FIG. 24 is a diagram illustrating a calculation processing flow.

FIG. 24 illustrates a calculation processing (E) flow. Processing operations illustrated in S1801 to S1807 are the same as those in a case of FIG. 18.

The calculation unit 1605 calculates an average of reception intervals (S2401). Based on the relevant average, the calculation unit 1605 calculates variance of reception intervals (S2403). The calculation unit 1605 determines whether or not the variance of reception intervals is less than a reference value (S2405).

In a case where the variance of reception intervals is greater than or equal to the reference value, the average of reception intervals is not used. In this example, the calculation unit 1605 identifies a maximum reception interval (S2407). The calculation unit 1605 multiplies the identified maximum reception interval by a predetermined coefficient (S2409). In addition, a product obtained in S2409 is defined as the monitoring time period.

Note that the processing operations in S2407 and S2409 are the same as the processing operations in S1809 and S1811 in the calculation processing (A) illustrated in FIG. 18. The processing operations in S2407 and S2409 may be replaced with the processing operations in S2101 to S2109 in the calculation processing (B) illustrated in FIG. 21. The processing operations in S2407 and S2409 may be replaced with the processing operations in S2201 to S2207 in the calculation processing (C) illustrated in FIG. 22. In addition, the processing operations in S2407 and S2409 may be replaced with the processing operations in S2301 to S2307 in the calculation processing (D) illustrated in FIG. 23.

In in a case where, in S2405, it is determined that the variance of reception intervals is less than the reference value, the calculation unit 1605 multiplies the average of reception intervals by a predetermined coefficient (S2411). In addition, a product obtained in S2411 is defined as the monitoring time period. In a case where the calculation processing (E) finishes, the processing returns to the adjustment processing (A) serving as a call source.

In addition, in place of the above-mentioned calculation processing (A), calculation processing (F) may be performed. The calculation processing (F) is based on a calculation formula of "Monitoring Time Period=Predetermined Coefficient×Variance of Reception Intervals×Average of Reception Intervals".

Figure 25:
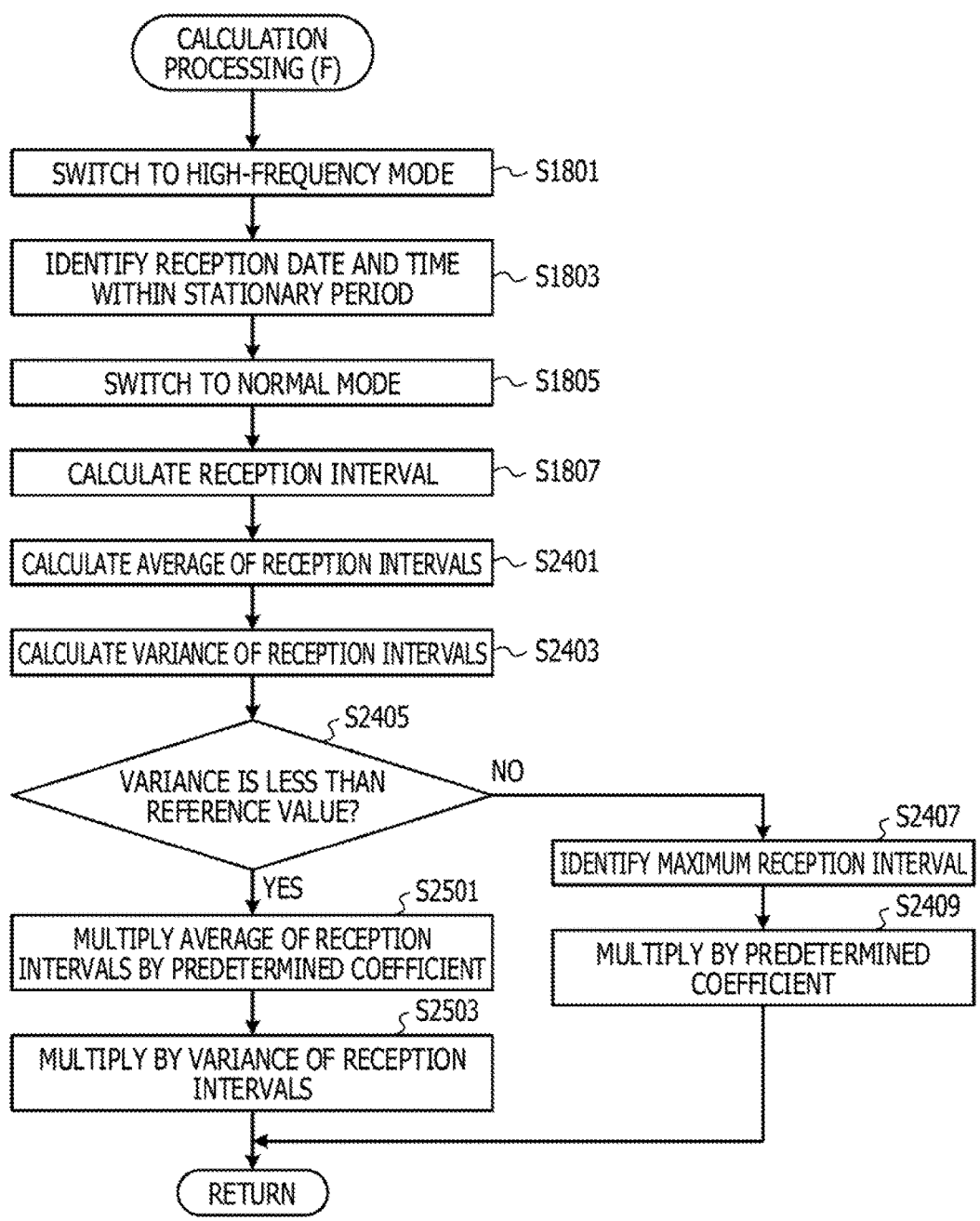
FIG. 25 is a diagram illustrating a calculation processing flow.

FIG. 25 illustrates a calculation processing (F) flow. Processing operations illustrated in S1801 to S1807 are the same as those in a case of FIG. 18. In addition, processing operations illustrated in S2401 to S2409 are the same as those in a case of FIG. 24.

The calculation unit 1605 multiplies the average of reception intervals by a predetermined coefficient (S2501). The calculation unit 1605 multiplies a product obtained in S2501 by the variance of reception intervals (S2503). In addition, a product obtained in S2503 is defined as the monitoring time period. In a case where the calculation processing (F) finishes, the processing returns to the adjustment processing (A) serving as a call source.

In addition, in place of the above-mentioned calculation processing (A), calculation processing (G) may be performed. The calculation processing (G) is based on "Monitoring Time Period=Predetermined Coefficient×Response Coefficient Related to Service×Average of Reception Intervals".

Figure 26:
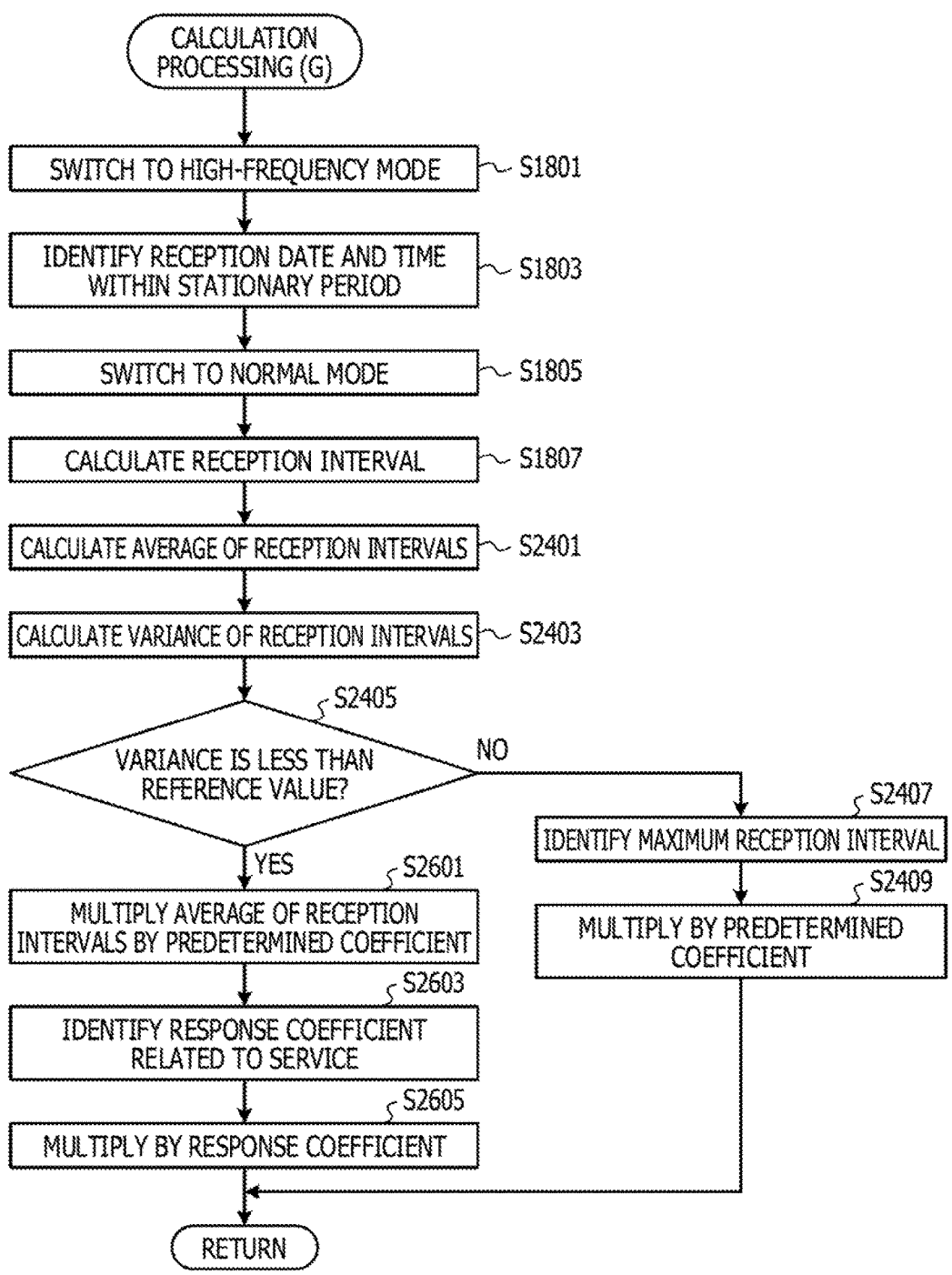
FIG. 26 is a diagram illustrating a calculation processing flow.

FIG. 26 illustrates a calculation processing (G) flow. Processing operations illustrated in S1801 to S1807 are the same as those in a case of FIG. 18. In addition, processing operations illustrated in S2401 to S2409 are the same as those in a case of FIG. 24.

The calculation unit 1605 multiplies the average of reception intervals by a predetermined coefficient (S2601). The calculation unit 1605 identifies a response coefficient related to a service (S2603). The calculation unit 1605 multiplies a product obtained in S2601 by the response coefficient (S2605). In addition, a product obtained in S2605 is defined as the monitoring time period. In a case where the calculation processing (G) finishes, the processing returns to the adjustment processing (A) serving as a call source.

In addition, in place of the above-mentioned calculation processing (A), calculation processing (H) may be performed. The calculation processing (H) is based on a calculation formula of "Monitoring Time Period=Predetermined Coefficient×Congestion Coefficient of Radio Wave×Average of Reception Intervals".

Figure 27:
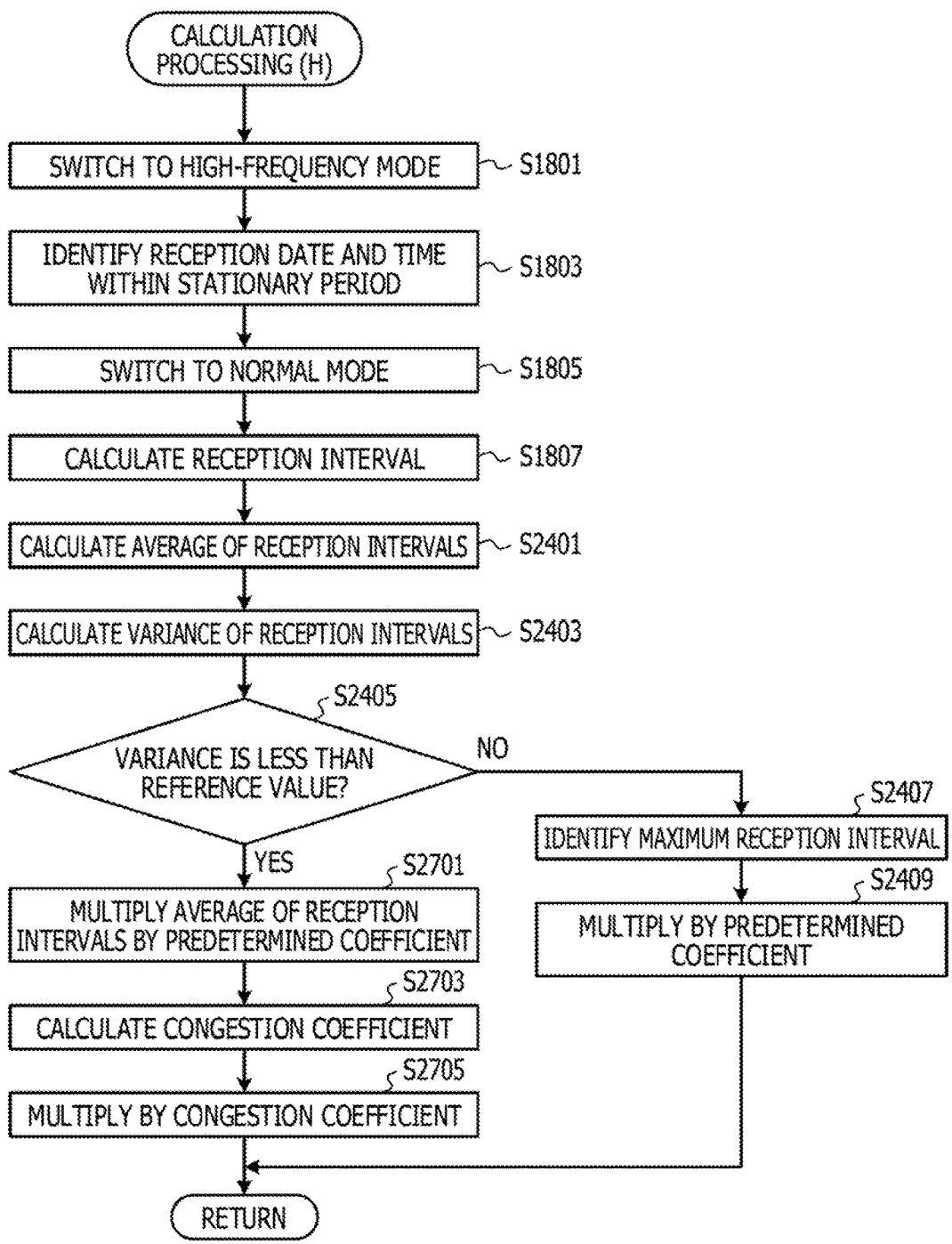
FIG. 27 is a diagram illustrating a calculation processing flow.

FIG. 27 illustrates a calculation processing (H) flow. Processing operations illustrated in S1801 to S1807 are the same as those in a case of FIG. 18. In addition, processing operations illustrated in S2401 to S2409 are the same as those in a case of FIG. 24.

The calculation unit 1605 multiplies the average of reception intervals by a predetermined coefficient (S2701). The calculation unit 1605 calculate a congestion coefficient of a radio wave (S2703). The calculation unit 1605 multiplies a product obtained in S2701 by the congestion coefficient of the radio wave (S2705). In addition, a product obtained in S2705 is defined as the monitoring time period. In a case where the calculation processing (H) finishes, the processing returns to the adjustment processing (A) serving as a call source.

Note that, in addition to the above-mentioned examples, the monitoring time period may be calculated based on a calculation formula of "Monitoring Time Period=Predetermined Coefficient×Variance of Reception Intervals×Response Coefficient Related to Service×Average of Reception Intervals". The monitoring time period may be calculated based on a calculation formula of "Monitoring Time Period=Predetermined Coefficient×Variance of Reception Intervals×Congestion Coefficient of Radio Wave×Average of Reception Intervals". The monitoring time period may be calculated based on a calculation formula of "Monitoring Time Period=Predetermined Coefficient×Response Coefficient Related to Service×Congestion Coefficient of Radio Wave×Average of Reception Intervals". In addition, the monitoring time period may be calculated based on a calculation formula of "Monitoring Time Period=Predetermined Coefficient×Variance of Reception Intervals×Response Coefficient Related to Service×Congestion Coefficient of Radio Wave×Average of Reception Intervals".

According to the present embodiment, the monitoring time period is calculated based on the average of reception intervals. Therefore, it is easy to set the monitoring period suitable for a usual situation.

In addition, the monitoring time period is calculated based on the variance of reception intervals. Therefore, it is easy to set the monitoring period corresponding to the fluidity of a situation.

In addition, the monitoring time period is calculated based on a request indicator related to a service utilizing a determination result of "out of area". Therefore, it is easy to reflect the intention of the service in the monitoring period.

In addition, the monitoring time period is calculated based on the degree of congestion of a radio wave. Therefore, it is easy to reflect the influence of another radio wave in the monitoring period.

Third Embodiment

In the present embodiment, an example in which the user terminal 101 inquires of an external device about a monitoring time period will be described.

Figure 28:
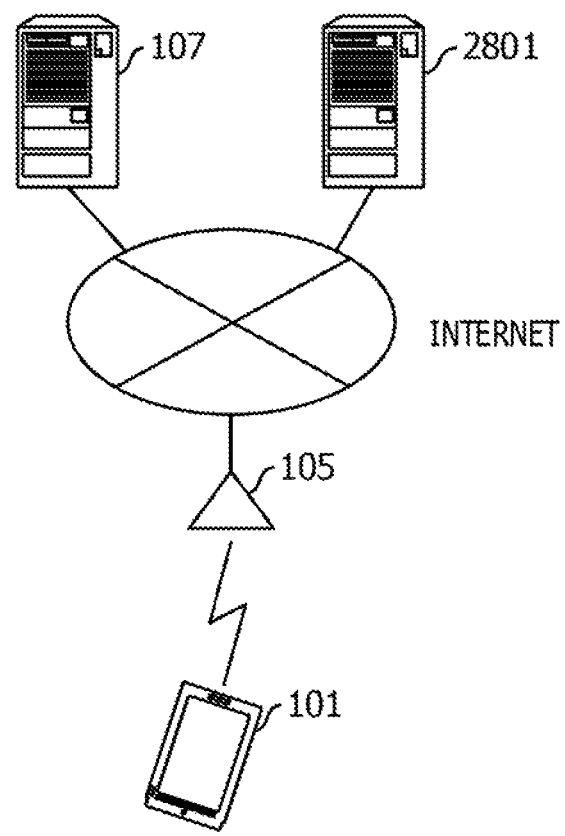
FIG. 28 is a diagram illustrating an example of a configuration of a system in a third embodiment.

FIG. 28 illustrates an example of a configuration of a system in the third embodiment. In the system, a management device 2801 is installed. The user terminal 101 is able to be coupled to the management device 2801 via the Internet.

Figure 29:
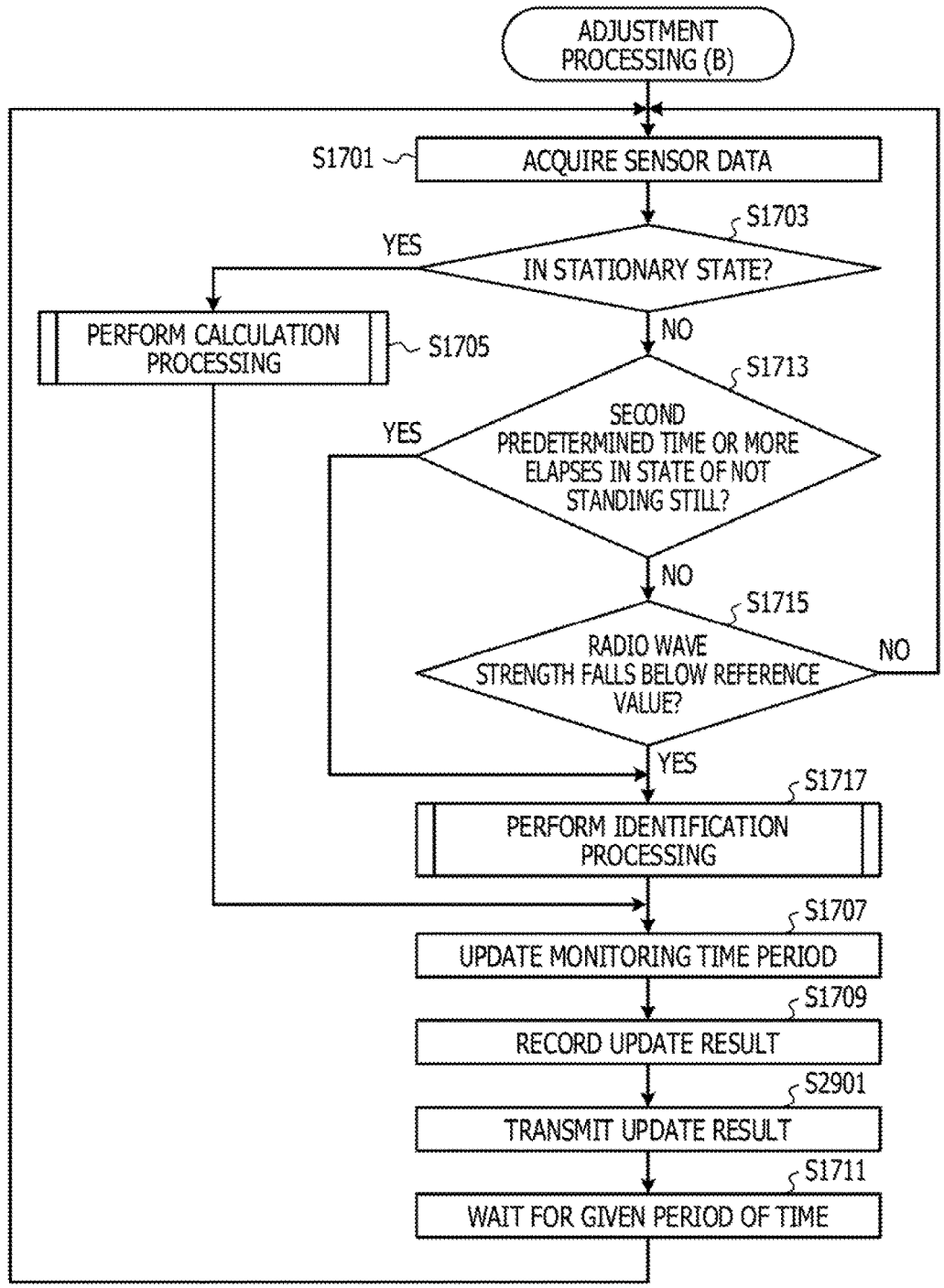
FIG. 29 is a diagram illustrating an adjustment processing flow.

First, an operation of the user terminal 101 will be described. In the present embodiment, in place of the above-mentioned adjustment processing (A), adjustment processing (B) is performed. FIG. 29 illustrates an adjustment processing (B) flow. Processing operations illustrated in S1701 to S1709 are the same as those in a case of FIG. 17.

After the processing operation illustrated in S1709 finishes, the transmission unit 1615 transmits an update result to the management device 2801 (S2901). The update result corresponds to records in the first update log table. Accordingly, update dates and times in the user terminal 101 are included therein.

Processing operations illustrated in S1711 to S1715 are the same as those in a case of FIG. 17.

In the present embodiment, in S1717, identification processing (B) is performed in place of the identification processing (A). The identification processing (B), the monitoring time period is identified based on an inquiry to the management device 2801.

Figure 30:
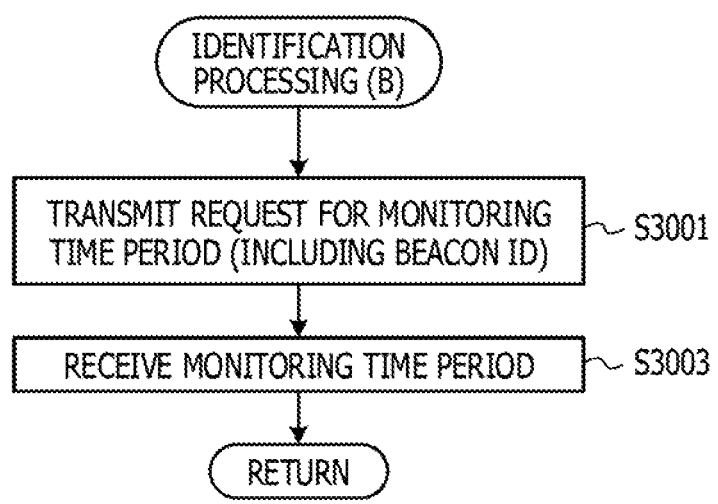
FIG. 30 is a diagram illustrating an identification processing flow.

FIG. 30 illustrates an identification processing (B) flow. The identification unit 1609 transmits, to the management device 2801, a request for the monitoring time period (including the beacon ID of the beacon signals serving as determination targets in S1303 and S1307 in FIG. 13) (S3001).

The identification unit 1609 receives the monitoring time period from the management device 2801 (S3003). After the identification processing (B) finishes, the processing returns to the adjustment processing (B) serving as a call source.

Figure 31:
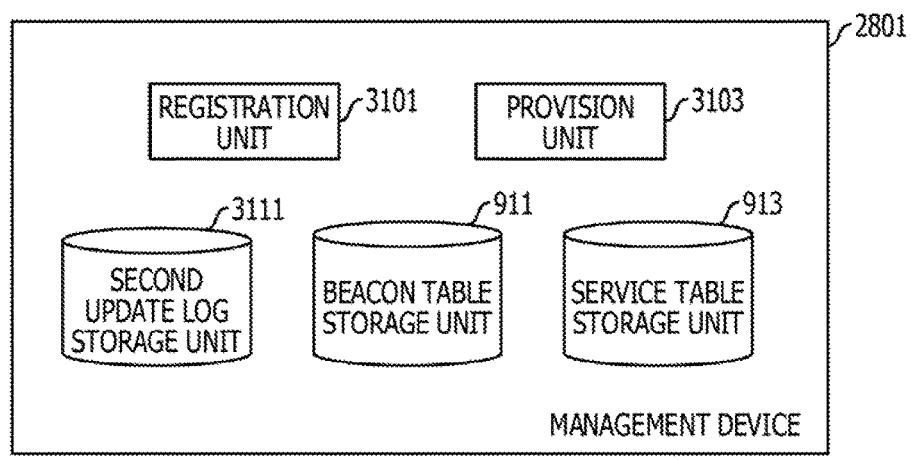
FIG. 31 is a diagram illustrating an example of a module configuration of a management device.

Next, an operation of the management device 2801 will be described. FIG. 31 illustrates an example of a module configuration of the management device 2801. The management device 2801 includes a registration unit 3101, a provision unit 3103, and a second update log storage unit 3111. In addition, the management device 2801 further includes a beacon table storage unit 911 and a service table storage unit 913.

The registration unit 3101 registers an update result in the second update log table. In response to an inquiry, the provision unit 3103 provides a monitoring time period. The second update log storage unit 3111 stores therein a second update log table. The second update log table will be described later by using FIG. 33.

The registration unit 3101 and the provision unit 3103, described above, are realized by using hardware resources (for example, FIG. 37) and a program causing a processor to perform processing described below.

Figure 37:
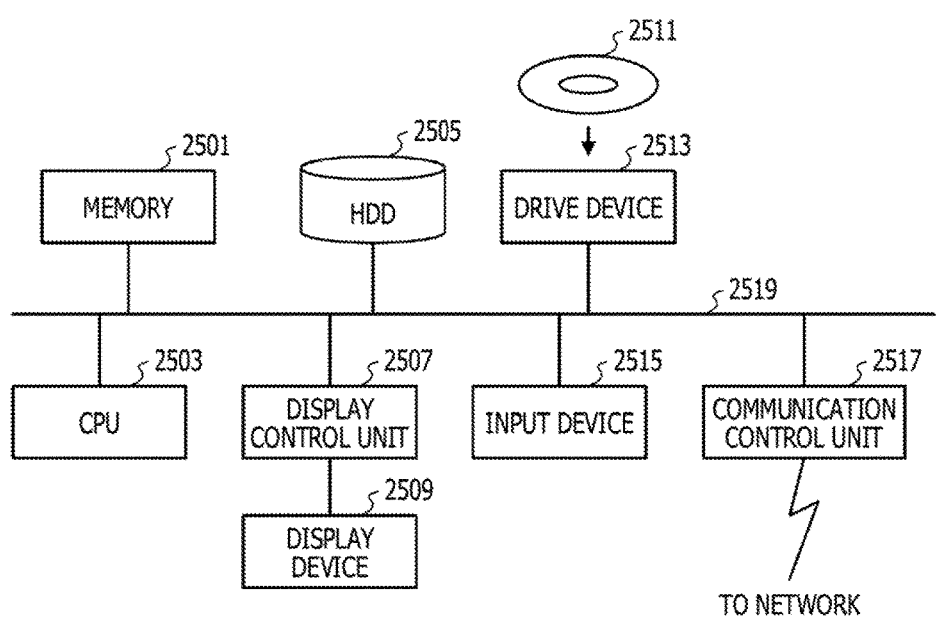
FIG. 37 is a functional block diagram of a computer.

The second update log storage unit 3111, the beacon table storage unit 911, and the service table storage unit 913, described above, are realized by using hardware resources (for example, FIG. 37)

Next, registration processing performed by the registration unit 3101 will be described. In the registration processing, update results in the respective user terminals 101 are collected.

Figure 32:
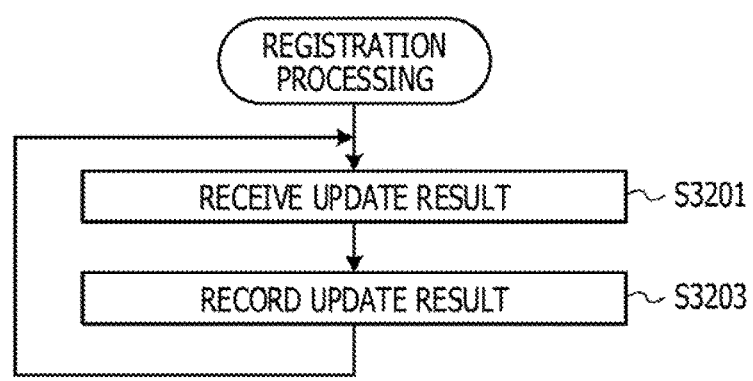
FIG. 32 is a diagram illustrating a registration processing flow.

FIG. 32 illustrates a registration processing flow. The registration unit 3101 waits and receives the update results from the respective user terminals 101 (S3201). In addition, the registration unit 3101 creates new records in the second update log table and records the update results therein (S3203). The registration unit 3101 stores the IDs of the respective user terminals 101 serving as transmission sources of the respective relevant update results. After S3203 finishes, the processing returns to the processing operation illustrated in S3201, and the above-mentioned processing is repeated.

FIG. 33 illustrates an example of a second update log table. The second update log table in this example includes records corresponding to opportunities at which monitoring time periods are updated in the respective user terminals 101. Records of the second update log table each include a field in which an update date and time is stored, a field in which a beacon ID is stored, a field in which a monitoring time period is stored, and a field in which a terminal ID is stored.

The update date and time identifies a timing at which a monitoring time period is updated in a corresponding one of the individual user terminals 101. The beacon ID identifies a transmission source of a beacon signal monitored by the relevant monitoring time period. The monitoring time period corresponds to an updated result. The terminal ID identifies the corresponding one of the user terminals 101, which updates the relevant monitoring time period.

Figure 34:
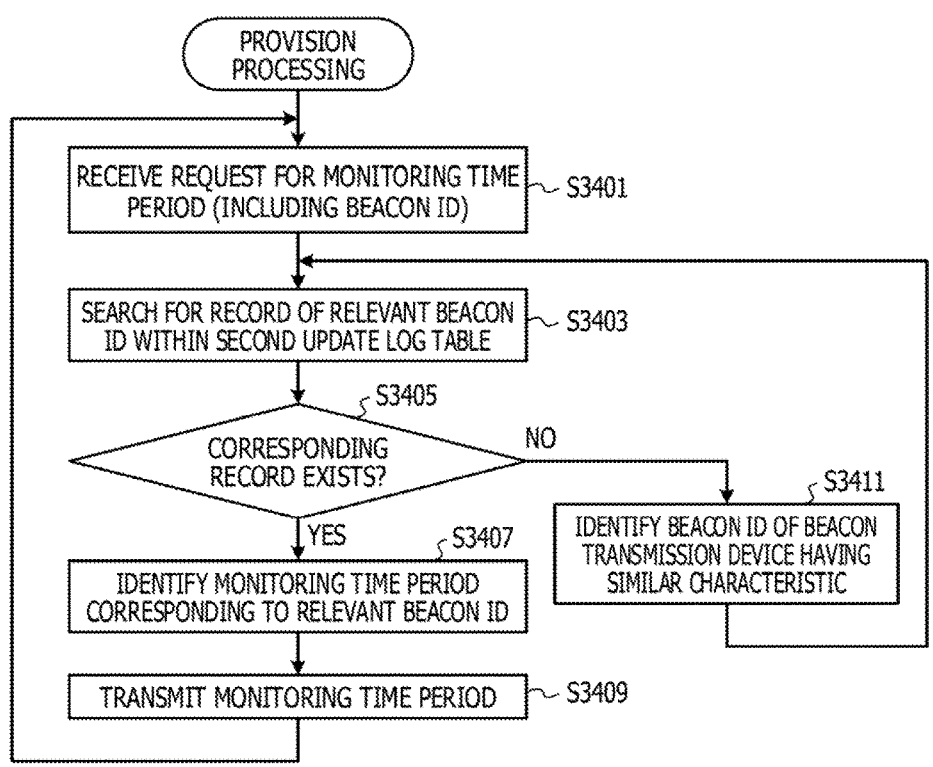
FIG. 34 is a diagram illustrating a provision processing flow.

Next, provision processing performed by the provision unit 3103 will be described. FIG. 34 illustrates a provision processing flow. The provision unit 3103 waits and receives a request for a monitoring time period from one of the user terminals 101 (S3401).

The provision unit 3103 identifies a beacon ID included in the request for the monitoring time period and searches, within the second update log table, for a record of the relevant beacon ID (S3403).

The provision unit 3103 determines whether or not a corresponding record exists (S3405). In a case where it is determined that a corresponding record exists, the provision unit 3103 identifies a monitoring time period corresponding to the relevant beacon ID (S3407). Note that, in a case where records of the monitoring time period corresponding to the relevant beacon ID exist, the provision unit 3103 may select a record including a latest update date and time. Alternatively, the identification unit 1609 may select a record including an update date and time related to a time close to the current moment, in other words, an update date and time in the same time zone.

The provision unit 3103 transmits the identified monitoring time period to the corresponding one of the user terminals 101 (S3409). In addition, the processing returns to the processing operation illustrated in S3401, and the above-mentioned processing is repeated.

On the other hand, in a case where, in S3405, it is determined that the corresponding record does not exist, the provision unit 3103 identifies a beacon ID of the beacon transmission device 103 having a similar characteristic (S3411). Based on a beacon table, the provision unit 3103 identifies a beacon ID situated in a nearby geographical location, for example. Alternatively, based on the beacon table, the provision unit 3103 may identify a beacon ID sharing a common facility type. In addition, the processing returns to S3403, and a record of the beacon ID identified in S3411 is searched for.

According to the present embodiment, a monitoring time period calculated in another one of the user terminals 101 is able to be applied.

Fourth Embodiment

While, in the above-mentioned embodiments, an example of switching to the high frequency mode in the calculation processing is described, switching to the high frequency mode does not have to be adopted.

Figure 35:
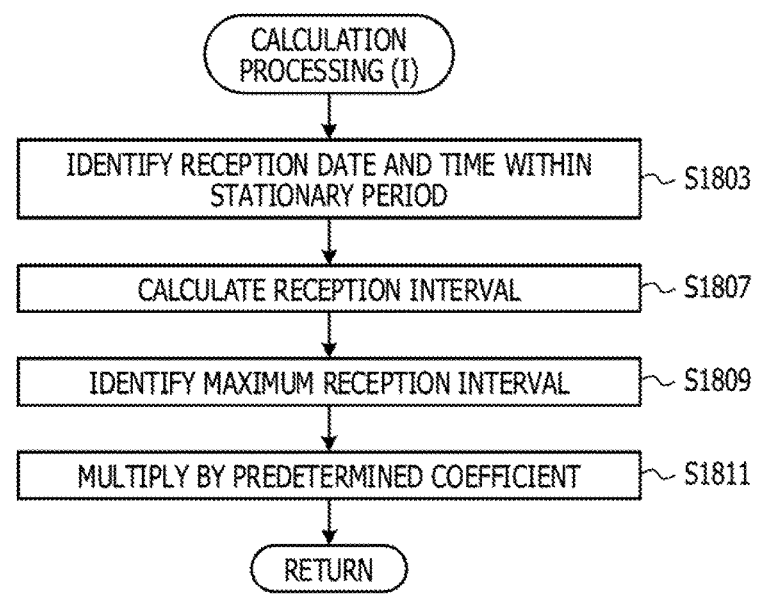
FIG. 35 is a diagram illustrating a calculation processing flow.

In the present embodiment, in place of the calculation processing (A), calculation processing (I) is performed. FIG. 35 illustrates a calculation processing (I) flow. The processing operation in S1801 in the calculation processing (A) illustrated in FIG. 18 is omitted. A processing operation in S1803 is the same as that in a case of the calculation processing (A). In addition, the processing operation in S1805 in the calculation processing (A) illustrated in FIG. 18 is omitted. Processing operations in S1807 to S1811 are the same as those in a case of the calculation processing (A).

Note that, in any one of the calculation processing (B) to the calculation processing (H), the processing operations in S1801 and S1805 may be omitted.

According to the present embodiment, processing becomes simple. In addition, there is an aspect that power consumption is suppressed.

Fifth Embodiment

In a case where even a stationary state is unsuitable for calculation of the monitoring time period, calculation of the monitoring period may be omitted.

Figure 36:
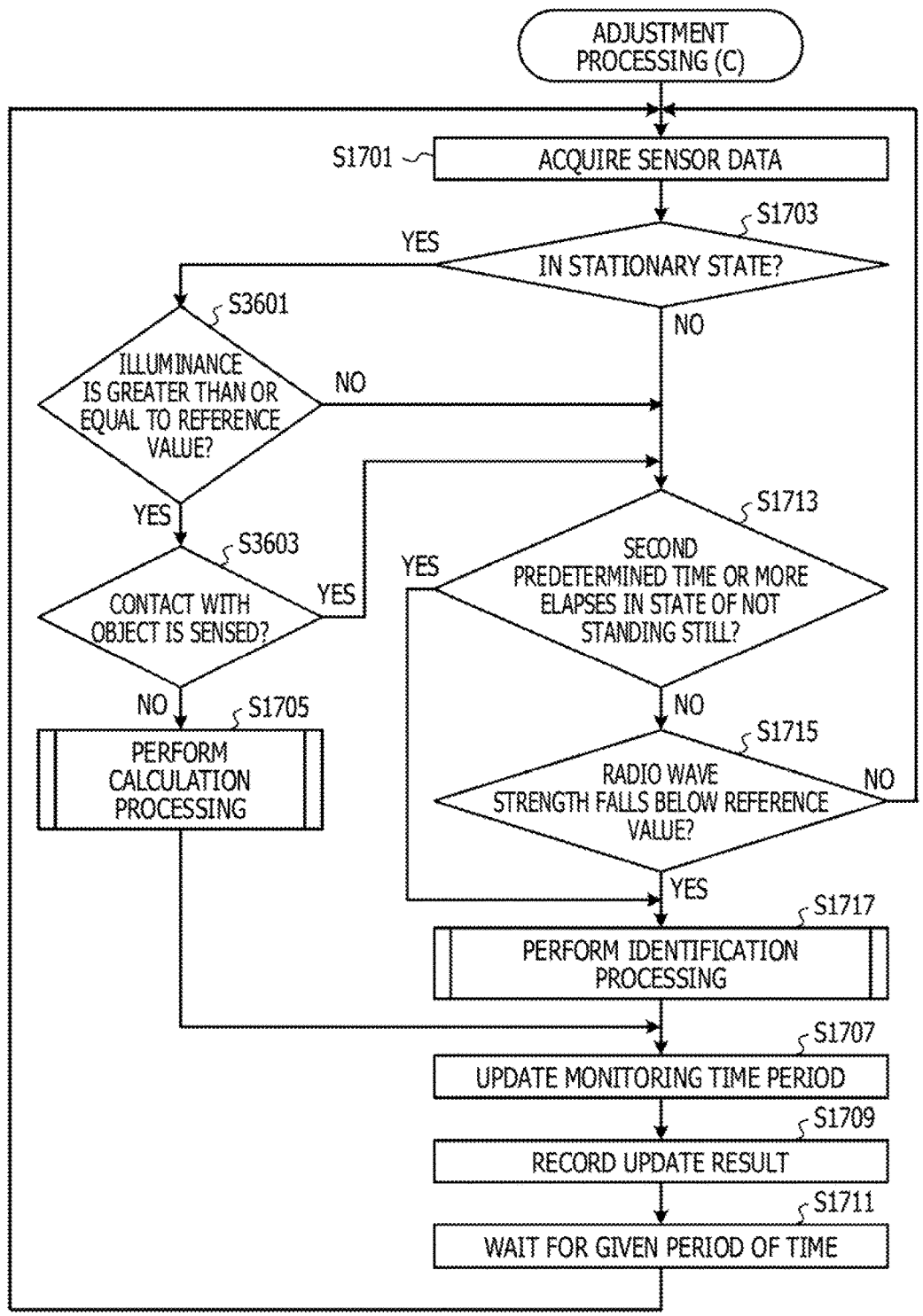
FIG. 36 is a diagram illustrating an adjustment processing flow.

In the present embodiment, in place of the adjustment processing (A), adjustment processing (C) is performed. FIG. 36 illustrates an adjustment processing (C) flow. Processing operations in S1701 and S1703 are the same as those in a case of the adjustment processing (A).

In a case where, in S1703, it is determined that the user terminal 101 is in the stationary state, the second determination unit 1603 determines whether or not illuminance measured by the illuminance sensor 841 is greater than or equal to a reference value (S3601). In a case where it is determined that the illuminance falls short of the reference value, the calculation processing is not performed, and the processing shifts to the processing operation in S1713. In a case where the user terminal 101 is put into, for example, a bag, the illuminance is less than the reference value. In this case, since it is difficult for a radio wave to penetrate, it is difficult to obtain a correct monitoring time period.

On the other hand, in a case where it is determined that the illuminance is greater than or equal to the reference value, the second determination unit 1603 determines whether or not the contact sensor 845 senses a contact with an object (S3603). In a case where it is determined that a contact with an object is sensed, the calculation processing is not performed, and the processing shifts to the processing operation in S1713. In a case where the user terminal 101 is in contact with, for example, an obstacle, a contact with an object is sensed. In this case, it is difficult for a radio wave to penetrate, and it may be difficult to obtain a correct monitoring time period.

In a case where a contact with an object is not sensed, the calculation processing in S1705 is performed. Processing operations in S1705 to S1717 are the same as those in a case of the adjustment processing (A).

Note that, in the adjustment processing (B), the processing operations in S3601 and S3603 may be performed.

According to the present embodiment, in a situation in which the user terminal 101 is put into, for example, a bag and it is difficult for a radio wave to penetrate, an undesired operation of calculating an inadequate monitoring period is omitted.

While, as above, embodiments of the present technology are described, the present technology is not limited to these. The above-mentioned functional block configuration is not coincident with, for example, a program module configuration, in some cases.

In addition, a configuration of each of the above-mentioned storage areas is just an example and does not have to adopt such a configuration as described above. Furthermore, in a processing flow, as long as a processing result is not changed, an order of processing operations may be changed or processing operations may be performed in parallel.

Note that the above-mentioned management device 2801 is a computer device, and as illustrated in FIG. 37, a memory 2501, a central processing unit (CPU) 2503, a hard disk drive (HDD) 2505, a display control unit 2507 coupled to a display device 2509, a drive device 2513 for a removable disk 2511, an input device 2515, and a communication control unit 2517 for being coupled to a network are coupled to one another via a bus 2519. An operating system (OS) and an application program for implementing processing operations in the present embodiment are stored in the HDD 2505 and are read from the HDD 2505 to the memory 2501 at a time of being executed by the CPU 2503. In accordance with a processing content of the application program, the display control unit 2507, the communication control unit 2517, and the drive device 2513 are controlled by the CPU 2503 so as to perform predetermined operations. In addition, while being mainly stored in the memory 2501, data in the middle of processing may be stored in the HDD 2505. In embodiments of the present technology, the application program for implementing the above-mentioned processing operations is stored in the computer-readable removable disk 2511 and is distributed, thereby being installed into the HDD 2505 by the drive device 2513. The application program is installed into the HDD 2505 via a network such as the Internet and the communication control unit 2517, in some cases. Hardware such as the CPU 2503 and the memory 2501 and programs such as the OS and the application program, described above, cooperate with one another in a coordinated fashion, thereby causing such a computer device to realize the above-mentioned various kinds of functions.

A summarization of the above-mentioned embodiments of the present technology is as follows.

An information processing method of an embodiment includes (A) calculation processing for calculating a length of a monitoring period, based on intervals at which a beacon signal is received in a period of duration of a stationary state of a self-device, and (B) determination processing for determining as being out of an area in proximity to a transmission source of the beacon signal in a case where the beacon signal is not received during the monitoring period having the length.

By doing so, in accordance with a situation, it is possible to adjust the length of the monitoring period for presence-in-area determination. There is an aspect that it is possible to achieve a balance between the readiness and the sensing performance.

In addition, an operation mode of beacon reception in the period of duration may be switched to a frequency higher than usual.

By doing so, it is possible to adjust the length of the monitoring period with a higher degree of accuracy.

Furthermore, identification processing for identifying the previously calculated length of the monitoring period regarding a beacon signal related to the same transmission source may be included. In addition, in the above-mentioned determination processing, the identified length of the monitoring period may be used.

By doing so, even in a case where it is difficult to understand a current situation, it is possible to adjust the length of the monitoring period, based on an estimated situation.

In addition, in a case where previously calculated lengths of the monitoring period are stored, the length of the monitoring period based on reception intervals of the beacon signal having a near reception time may be identified in the above-mentioned identification processing.

By doing so, it is possible to estimate a situation, based on a time zone.

In addition, in a case where the previously calculated lengths of the monitoring period are stored, the length of the monitoring period based on reception intervals of the latest beacon signal may be identified in the above-mentioned identification processing.

By doing so, it is possible to adjust the length of the monitoring period, based on a temporally close situation.

In addition, by inquiring of an external device, the length of the monitoring period may be identified in the above-mentioned identification processing.

By doing so, it is possible to apply the length of a monitoring period, not self-calculated.

In addition, in a case where a period during which the stationary state of the self-device is not detected exceeds a reference value, the above-mentioned identification processing may be performed.

By doing so, in a case where a reception state varies along with, for example, a movement of a user, it is possible to re-evaluate the monitoring time period.

In addition, in a case where a radio wave strength of the received beacon signal falls below a reference value, the above-mentioned identification processing may be performed.

By doing so, in the vicinity of a boundary of a proximity area, for example, it is possible to re-evaluate the monitoring period.

In addition, in the above-mentioned calculation processing, the length of the monitoring period may be calculated based on a maximum value of reception intervals.

By doing so, it is easy to set a monitoring period corresponding to an undesirable situation.

In addition, in the above-mentioned calculation processing, the length of the monitoring period may be calculated based on an average of reception intervals.

By doing so, it is easy to set a monitoring period suitable for a usual situation.

In addition, in the above-mentioned calculation processing, the length of the monitoring period may be calculated based on variance of reception intervals.

By doing so, it is easy to set a monitoring period corresponding to the fluidity of a situation.

In addition, in the above-mentioned calculation processing, the length of the monitoring period may be calculated based on a request indicator related to a service utilizing a determination result of "out of area".

By doing so, it is easy to reflect the intention of the service in the monitoring period.

In addition, in the above-mentioned calculation processing, the length of the monitoring period may be calculated based on the degree of congestion of a radio wave.

By doing so, it is easy to reflect the influence of another radio wave in the monitoring period.

In addition, in a case where measured illuminance falls below a reference value, the above-mentioned calculation processing may be omitted.

By doing so, in a situation in which the self-device is put into, for example, a bag and it is difficult for a radio wave to penetrate, an undesired operation of calculating an inadequate monitoring period is omitted.

In addition, in a case where a contact with an object is sensed, the above-mentioned calculation processing may be omitted.

By doing so, in a situation in which the self-device is contact with, for example, an obstacle and it is difficult for a radio wave to penetrate, an undesired operation of calculating an inadequate monitoring period is omitted.

In addition, in a case where it is difficult to identify the previously calculated length of the monitoring period regarding a beacon signal related to the same transmission source, the previously calculated length of the monitoring period may be identified regarding a beacon signal from another transmission source having a characteristic similar to that of the transmission source of the beacon signal, in the above-mentioned identification processing.

By doing so, it is possible to estimate a monitoring period correct to some degree.

Note that a program for causing a processor to perform the above-mentioned processing is able to be created, and the relevant program may be stored in a computer-readable storage medium such as, for example, a flexible disk, a CD-ROM, a magneto-optical disk, a semiconductor memory, or a hard disk or a storage device. Note that in general an intermediate processing result is temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing method, performed by a computer, the method comprising:
   executing, by processor of the computer, a processing that includes acquiring a beacon signal from a radio circuit coupled to the processor and configured to receive the beacon signal from a transmission source;
   executing, by the processor of the computer, a calculation processing that includes calculating a length of a monitoring period, based on time intervals at which the beacon signal is received in a period of duration of a stationary state of the computer; and
   executing, by the processor of the computer, a determination processing that includes determining as being out of an area in proximity to the transmission source of the beacon signal in a case where the beacon signal is not received during the monitoring period having the length calculated by the calculation processing.

2. The information processing method according to claim 1, wherein, in the calculation processing, the length of the monitoring period is set longer when the interval at which the beacon signal is received is longer.

3. The information processing method according to claim 1, further comprising:
   executing, by the processor of the computer, a switching processing that includes switching an operation mode of beacon reception in the period of duration to a frequency higher than usual.

4. The information processing method according to claim 3, further comprising:
   executing, by the processor of the computer, an identification processing that includes identifying the previously calculated length of the monitoring period regarding a beacon signal related to the same transmission source,
   wherein the determination processing includes using the identified length of the monitoring period.

5. The information processing method according to claim 4,
   wherein the identification processing includes identifying the length of the monitoring period based on reception intervals of the beacon signal having a near reception time in a case where previously calculated lengths of the monitoring period are stored.

6. The information processing method according to claim 4,
   wherein the identification processing includes identifying the length of the monitoring period based on reception intervals of the latest beacon signal in a case where the previously calculated lengths of the monitoring period are stored.

7. The information processing method according to claim 6,
   wherein the identification processing includes identifying the length of the monitoring period by inquiring of an external device.

8. The information processing method according to claim 7,
wherein the identification processing includes performing identification of the length of the monitoring period in a case where a period during which the stationary state of the self-device is not detected exceeds a reference value.

9. The information processing method according to claim 8,
wherein the identification processing includes performing identification of the length of the monitoring period in a case where a radio wave strength of the received beacon signal falls below a reference value.

10. The information processing method according to claim 9,
wherein the calculation processing includes calculating the length of the monitoring period, based on a maximum value of reception intervals.

11. The information processing method according to claim 9,
wherein the calculation processing includes calculating the length of the monitoring period, based on an average of reception intervals.

12. The information processing method according to claim 11,
wherein the calculation processing includes calculating the length of the monitoring period, based on variance of the reception intervals.

13. The information processing method according to claim 11,
wherein the calculation processing includes calculating the length of the monitoring period, based on a request indicator related to a service utilizing the determination result of being out of an area.

14. The information processing method according to claim 11,
wherein the calculation processing includes calculating the length of the monitoring period, based on the degree of congestion of a radio wave.

15. The information processing method according to claim 14,
wherein the calculation processing includes skipping calculation of the length of the monitoring period in a case where measured illuminance falls below a reference value.

16. The information processing method according to claim 15,
wherein the calculation processing includes skipping the calculation of the length of the monitoring period in a case where a contact with an object is sensed.

17. The information processing method according to claim 9,
wherein the identification processing includes identifying the previously calculated length of the monitoring period regarding a beacon signal from another transmission source having a characteristic similar to that of the transmission source of the beacon signal in a case where it is difficult to identify the previously calculated length of the monitoring period regarding a beacon signal related to the same transmission source.

18. A non-transitory computer-readable storage medium for storing a program that causes a computer to execute a process, the process comprising:
executing, by a processor of the computer, a processing that includes acquiring a beacon signal from a radio circuit coupled to the processor and configured to receive the beacon signal from a transmission source;
executing, by the processor of the computer, a calculation processing that includes calculating a length of a monitoring period, based on time intervals at which the beacon signal is received in a period of duration of a stationary state of the computer; and
executing a determination processing that includes determining as being out of an area in proximity to the transmission source of the beacon signal in a case where the beacon signal is not received during the monitoring period having the length calculated by the calculation processing.

19. An information processing device, comprising:
a memory;
a radio circuit configured to receive a beacon signal from a transmission source; and
a processor coupled to the memory and the radio circuit, and configured to
execute a calculation processing that includes calculating a length of a monitoring period, based on time intervals at which the beacon signal is received in a period of duration of a stationary state of the information processing device; and
execute a determination processing that includes determining as being out of an area in proximity to the transmission source of the beacon signal in a case where the beacon signal is not received during the monitoring period having the length.

* * * * *